(12) United States Patent
Desai et al.

(10) Patent No.: US 11,799,926 B2
(45) Date of Patent: Oct. 24, 2023

(54) METHODS, SYSTEMS, AND DEVICES FOR PRESENTING DEMONSTRATION OBJECTS IN A VIDEOCONFERENCE

(71) Applicant: Motorola Mobility LLC, Chicago, IL (US)

(72) Inventors: Rahul Bharat Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 30 days.

(21) Appl. No.: 17/670,081

(22) Filed: Feb. 11, 2022

(65) Prior Publication Data

US 2023/0262101 A1    Aug. 17, 2023

(51) Int. Cl.

| | |
|---|---|
| *H04L 65/403* | (2022.01) |
| *G06V 40/20* | (2022.01) |
| *G06F 3/16* | (2006.01) |
| *G06T 11/00* | (2006.01) |
| *H04L 65/613* | (2022.01) |

(52) U.S. Cl.
CPC .......... *H04L 65/403* (2013.01); *G06F 3/16* (2013.01); *G06T 11/00* (2013.01); *G06V 40/28* (2022.01); *H04L 65/613* (2022.05); *G06T 2200/24* (2013.01)

(58) Field of Classification Search
CPC ..... H04L 65/403; H04L 65/613; G06V 40/20; G06T 11/001; G06F 3/16

USPC ............................................ 348/14.01–14.16
See application file for complete search history.

(56) References Cited

U.S. PATENT DOCUMENTS

| | | | |
|---|---|---|---|
| 2021/0392175 A1* | 12/2021 | Gronau | G06T 15/205 |
| 2022/0353473 A1* | 11/2022 | Springer | H04N 5/272 |
| 2023/0045116 A1* | 2/2023 | Pitts | H04N 7/152 |
| 2023/0117301 A1* | 4/2023 | Olivieri | H04L 65/403 |
| | | | 348/14.07 |

OTHER PUBLICATIONS

"Changing Your Virtual Background Image", Zoom Support; Unknown Publication but prior to filing of present application; Updated Mar. 8, 2022; Available online at https://support.zoom.us/hc/en-us/articles/210707503-Changing-your-Virtual-Background-image.

* cited by examiner

*Primary Examiner* — Melur Ramakrishnaiah
(74) *Attorney, Agent, or Firm* — Philip H. Burrus, IV

(57) ABSTRACT

A conferencing system terminal device includes an image capture device capturing images of a subject during a videoconference occurring across a network and a communication device transmitting the images to at least one remote electronic device engaged in the videoconference. One or more processors apply a virtual background or virtual background indicia in the images behind depictions of the subject. In response to one or more sensors detecting initiation of a demonstration operation by the subject, the one or more processors cause the virtual background or virtual background indicia to appear behind depictions of a demonstration object of the demonstration operation such that the demonstration object is visible against the virtual background indicia or virtual background.

20 Claims, 12 Drawing Sheets

METHODS, SYSTEMS, AND DEVICES FOR PRESENTING DEMONSTRATION OBJECTS IN A VIDEOCONFERENCE

BACKGROUND

Technical Field

This disclosure relates generally to electronic devices, and more particularly to electronic devices capable of providing video conferencing features.

Background Art

Many modern electronic devices, including smartphones, tablet computers, and laptop computers, are equipped to engage in videoconferences with other electronic devices across a network. Users employ such devices to communicate with friends, family, and work colleagues. This is especially true during times of pandemic, when people work remotely rather than going to a centralized office. Participants engage videoconferencing to engage in real-time discussions and share electronic content. Videoconferencing additionally offers participants the ability to see other participants via video feeds streamed to the participating electronic devices.

During videoconferences, people sometimes select "virtual" background images rather than showing what is physically behind them in the field of view of their image capture device. They do this for many reasons, one of which to make meetings more fun and engaging. Another is that these virtual backgrounds also work to protect privacy. For instance, a virtual background might replace depictions of a messy room situated behind the participant.

While virtual backgrounds are interesting features available in videoconferencing software, prior art versions blur out all objects other than the participant's face and torso. It would be advantageous to have an improved methods, systems, and devices to make the presentation of objects other than the torso or face during videoconferences using virtual backgrounds simpler and more efficient.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
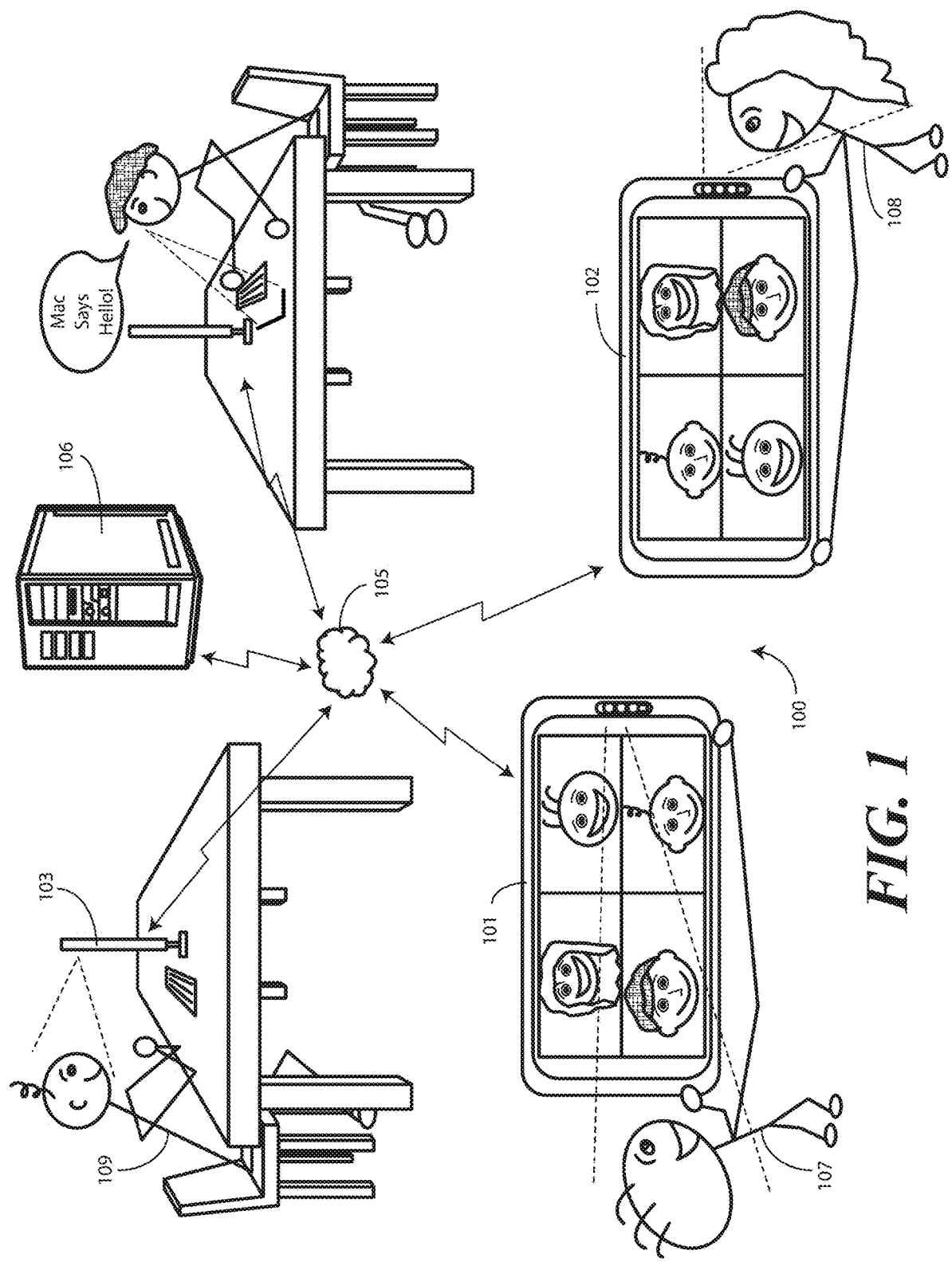
FIG. 1 illustrates one explanatory conferencing system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, in response to one or more sensors detecting initiation of a demonstration operation, causing a virtual background indicia to appear behind depictions of a demonstration object such that the demonstration object is visible against the virtual background indicia in images transmitted to at least one remote electronic device engaged in a video conference. In effect, embodiments of the disclosure prevent the virtual background indicia from "blurring" or otherwise obscuring the demonstration object when the initiation or commencement of a demonstration operation is detected. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of applying a virtual background to portions of images depicting objects other than a subject and a demonstration object such that both the subject and the demonstration object are visible against the virtual background in those images in a videoconference as described herein. The non-processor circuits may include, but are not limited to, analog or digital video processing circuits, analog or digital audio processing circuits, a radio receiver, a radio transmitter, signal drivers, clock circuits, power source circuits, and user input devices. As such, these functions may be interpreted as steps of a method to perform the generation and application of a virtual background in response to, in one or more embodiments, a demonstration operation monitoring engine detecting initiation of a demonstration operation for one or more videoconference feeds received from one or more conferencing system terminal devices, with that application creating one or more embodiments modified background videoconference feeds in which the demonstration object of the demonstration operation is visible against the virtual background for delivery to other conferencing system terminal devices.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

In response to the COVID-19 pandemic, never before have employees worked remotely on such a massive scale. When millions of companies shifted to fully remote working conditions in a short period of time to slow the spread of the Coronavirus Disease 2019, videoconferencing became the logical solution for connecting the remote workforce and keeping teams productive from home. In a matter of weeks, video conferencing usage exploded, permeating nearly all aspects of professional and personal life. In addition to business-related meetings, remote teams around the globe began using video conferencing to host virtual happy hours, ice breaker activities, online games, wine tastings, birthday parties, and other social activities.

As the line between work and home then became blurred, videoconferencing attendees began to desire some degree of privacy during videoconferences. In particular, they desired not to show more of their home to the other videoconference participants than that which is absolutely necessary. For this reason, attendees began to use virtual backgrounds. These virtual backgrounds blur, or completely replace, the static background elements behind a person and allow only the person's head, face, and torso to be seen. By obscuring the background setting behind a person, an untidy kitchen (for example) remains invisible while the person is engaged in a videoconference.

Accordingly, in formal meetings such as those held with clients, virtual backgrounds can make corresponding videoconferences appear more professional. Rather than someone seeing a messy bedroom, the application of a virtual background image can make it appear as if one is working in a high-rise office building. Moreover, for videoconferencing participants joining a conference call from a public space, the application of a virtual background allows other videoconferencing participants to focus on the participant rather than what is occurring behind the participant.

In addition to protecting privacy, people often use virtual backgrounds for other reasons as well. Illustrating by example, videoconferencing participants frequently apply these virtual backgrounds to make calls and meetings more fun and engaging. For instance, if you want to talk to your friends or coworkers from the beach, the Himalayas, or even the surface of the moon, applying a "beach," "mountain," or "moon" themed virtual background to a videoconferencing feed allowed this to be quickly and easily simulated.

The problem with traditional videoconferencing virtual backgrounds is that they blur everything other than the person's head and torso. As such, it is not possible to demonstrate objects such as items held in a hand. This is true for at least two reasons: First, in prior art systems if the object is revealed portions of the background around the object are also revealed. This is a particularly problematic in that the messy bedroom or untidy kitchen referenced above instantly becomes revealed. During a professional videoconference, this can be embarrassing or, worse, can cause a major business deal to fall through.

A second problem is that most prior art videoconference systems would simply blur the demonstration object as well. As noted above, most videoconference systems blur everything other than the torso and head. Accordingly, if a user intended to demonstrate something such as a pet cat passing in front of a videoconference camera, the cat would be blurred just as is the background due to the fact that the cat is not the user's head or torso. Accordingly, the only way for the videoconference participant to show the cat would be to turn off the virtual background. However, once again this would reveal the true background, which may be embarrassing or problematic for the aforementioned reasons.

Embodiments of the disclosure provide a solution to this problem by detecting, with a demonstration operation monitoring engine in one or more embodiments, the initiation of a demonstration operation for one or more videoconference feeds. This can occur in a variety of ways. In one or more embodiments, the demonstration operation monitoring engine uses a camera as a sensor to identify a videoconference participant picking up an object and moving it to and/or within a field of view of the camera, thereby making the object a point of interest within that field of view.

In other embodiments, the demonstration operation monitoring engine can monitor audio signals being captured and transmitted during the videoconference to identify commands that indicate the initiation of a demonstration operation. Illustrating by example, a videoconference participant may say, "let me show you how this function works on this device" while moving the device into the field of view of a camera to indicate that a demonstration operation using the device as the demonstration object will commence.

In still other embodiments, the demonstration operation monitoring engine can provide a de-blurred preview mode to a videoconference participant. This preview mode automatically identifies and tags videoconference participants and objects such as faces, torsos, dogs, cats, electronic devices, charts, figures, models, and other demonstration objects within the field of view of a camera. A videoconference participant can then select which of these objects are the demonstration object so that the demonstration operation monitoring engine can unblur the same.

In one or more embodiments, once the demonstration operation monitoring engine detects the initiation of a demonstration operation for one or more videoconference feeds, the demonstration operation monitoring engine can apply a virtual background to a particular videoconference feed depicting the demonstration operation to create one or more modified background videoconference feeds where the demonstration object of the demonstration operation is visible against the virtual background. This deblurs not only the user, but the demonstration object of the demonstration operation as well. Advantageously, a person can intuitively and quickly unblur a demonstration object by signaling that a demonstration operation will begin in a natural and conversational manner. The person can also cause the demonstration operation to become unblurred without diverting from their presentation, thoughts, or comments.

In one or more embodiments, a conferencing system terminal device includes an image capture device capturing images of a subject during a videoconference occurring across a network. A communication device transmits the images to at least one remote electronic device engaged in the videoconference.

In one or more embodiments, the conferencing system terminal device includes one or more sensors and one or more processors. The one or more processors apply virtual background indicia in the images behind depictions of the subject.

In one or more embodiments, in response to the one or more sensors detecting initiation of a demonstration operation by the subject, the one or more processors cause the virtual background indicia to appear behind depictions of a demonstration object of the demonstration operation such that the demonstration object is visible against the virtual background indicia in the images transmitted to the at least one remote electronic device engaged in the videoconference. This results in the virtual background indicia obscuring portions of the images depicting objects other than the subject and the demonstration object.

As noted above, detection of the demonstration operation can occur in a variety of ways. In one or more embodiments, the one or more sensors detect the initiation of the demonstration operation by detecting a hand of the subject moving into the field of view of the image capture device. In another embodiment, the one or more sensors detect the initiation of the demonstration operation by detecting the hand of the subject holding an object and moving into the field of view of the image capture device. In still other embodiments, the one or more sensors detect the initiation of the demonstration operation by detecting the hand of the subject picking up the object and moving the object within the field of view of the image capture device.

The one or more sensors can also detect the initiation of the demonstration operation from contextual information. This contextual information can be detected during the videoconference and prior to the communication device transmitting the images to the at least one remote electronic device engaged in the videoconference. Examples of such contextual information include audio content received by the one or more sensors that includes an indication that the demonstration operation will commence, e.g., "let me show you this." Other examples of such contextual information can include image processing. Illustrating by example, one or more processors may analyze images to read text presented on slides indicating that a demonstration operation will commence, and so forth.

In one or more embodiments, a method configured in accordance with embodiments of the disclosure determines that a videoconference participant is actively engaged in a videoconference with their outgoing video feed turned ON. The method then determines that the user is also using a virtual background to blur, replace, or obscure the actual background. In one or more embodiments, the virtual background blurs everything but the head and torso of the videoconference participant.

The method then detects a demonstration operation commencing. This can be detected using a camera sensor to identify the videoconference participant picking up a demonstration object and moving it in front of the image capture device to indicate that the demonstration object is a point of interest, by using audio processing techniques to process received audio input indicating an intention to initiate a demonstration operation, or by providing a deblurred preview of any detected objects to the videoconference participant so that the participant can select an object to be deblurred as a demonstration object. Other techniques will be described below. Still others will be obvious to those of ordinary skill in the art having the benefit of this disclosure. An artificial intelligence engine can be used to only deblur objects that are thus identified in addition to the user while keeping the remainder of the background blurred, replaced, or obscured.

Advantageously, by automatically deblurring a demonstration object within the video background indicia in a videoconference feed, embodiments of the disclosure automatically and dynamically allow a videoconference participant to intuitively show demonstration objects to others.

Other advantages will be described below. Still others will be obvious to those of ordinary skill in the art having the benefit of this disclosure.

In one or more embodiments, a videoconferencing system supports speech detection and audio transcription. These features could be performed in a conferencing system terminal device engaged in the videoconference or, alternatively, by a videoconferencing server complex. In one or more embodiments, one or more processors of the conferencing system terminal device or the videoconferencing server complex perform operations to extract contextual information from the transcription of the speech present in the audio feed of the videoconference. Illustrating by example, the one or more processors may detect the words "here, I'll show it to you," or "look at this device," or "look at this chart" from the transcription.

Contextual information can also be extracted from the video feed associated with the videoconference as well in one or more embodiments. Examples of such contextual information include the depictions of a person picking up an object, depictions of a person moving an object into a field of view of an image capture device, depictions of a person moving an object closer to an image capture device, and so forth. Other examples of contextual information that may be extracted from the video feed include depictions of new objects appearing within the field of view of an image capture device, changes in lighting conditions due to the presence of new objects in the field of view, changes in the color palette associated with a particular video feed due to a demonstration operation starting, new shapes appearing around the participant, and so forth. In one or more embodiments, contextual information can also be extracted from external sources such as cloud servers, networked servers, other electronic devices, social media servers, and so forth.

In one or more embodiments, once this contextual information is extracted and/or obtained, one or more processors of one or both of a conferencing system terminal device or a videoconference server complex use generative techniques to construct and apply real time video background indicia to the video feed of one or more participants of the videoconference that leaves detected demonstration objects visible against the virtual background indicia. For instance, one or more processors of a conferencing system terminal device may apply a virtual background that leaves an object identified as a demonstration object visible as a function of the contextual information. This application allows the virtual background indicia to blur, replace, or obscure portions of the images depicting objects other than the subject and the demonstration object to create contextually background modified images of the subject.

A communication device of the conferencing system terminal device may then transmit the contextually background modified images of the subject across a network to another conferencing system terminal device engaged in the videoconference. One or more processors can then present the contextually modified images of the subject on a display. Accordingly, embodiments of the disclosure provide systems, methods, and devices that orchestrate the contextual information from various sources and offer a combination of automatically applied, dynamic backgrounds that allow one or more demonstration objects to be clearly seen by everyone engaged in a videoconference. I Turning now to FIG. 1, illustrated therein is one explanatory videoconference system in accordance with one or more embodiments of the disclosure. As shown, multiple participants 107,108,109,110 each employ their own respective conferencing system terminal device 101,102,103,104 to engage with the other participants via the videoconference. In this illustrative embodiment, conferencing system terminal devices 101,102 are shown as smartphones, while conferencing system terminal devices 103,104 are shown as desktop computers. However, conferencing system terminal devices suitable for use in the videoconference system can take other forms as well. For instance, tablet computers, notebook computers, audiovisual devices, mobile phones, smart watches, or other devices can be used by participants to engage in the videoconference as well. Other examples of conferencing system terminal devices will be obvious to those of ordinary skill in the art having the benefit of this disclosure.

As shown in FIG. 1, each conferencing system terminal device 101,102,103,104 is engaged in wired or wireless communication with each other across a network 105, one example of which is the Internet via the World Wide Web. It should be noted that the network 105 could be a public, private, local area, wide area, or other type of network across which wired or wireless electronic communications can be exchanged.

In this illustrative embodiment, each conferencing system terminal device 101,102,103,104 is also in communication with a video conferencing system server complex 106 across the network 105. As will be described in more detail with reference to FIG. 8 below, in one or more embodiments video conferencing system server complex 106 includes components such as a web server, a database server, an audio server, and optionally a video server (the video server may be omitted for audio only conferencing systems) that are operable to facilitate videoconferences between the various conferencing system terminal devices 101,102,103,104 of the videoconference system.

These components of the video conferencing system server complex 106 can be combined on the same server. Alternatively, these components can be distributed on any number of servers to increase load handling capacity beyond that of a single server, and so forth. Other configurations for the video conferencing system server complex 106 will be obvious to those of ordinary skill in the art having the benefit of this disclosure.

In one or more embodiments, the video conferencing system server complex 106 performs functions such as maintaining a schedule of videoconferences, maintaining lists of participants, as well as allowing each participant's conferencing system terminal device to engage with the videoconference, and so forth. In one or more embodiments, the video conferencing system server complex 106 also facilitates the transmission of audio and video content during the occurrence of the videoconference.

In one or more embodiments, the video conferencing system server complex 106 functions as an intermediary device to facilitate sharing of audio and/or video content and/or data between the various conferencing system terminal devices 101,102,103,104. For example, as can be seen on the displays of conferencing system terminal devices 101, 102, in this example each participant 107,108,109,110 can see each other participant engaged in the videoconference.

In the illustrative example of FIG. 1, the participants 107,108,109,110 are engaged in the videoconference. Since the participants 107,108,109,110 are all engaged in a videoconference, each can see conference content in the form of a combined video feed from each other participant 107,108,109,110 presented on the display of each conferencing system terminal device 101,102,103,104, as well as a video feed of themselves. Under ordinary conditions, each participant 107,108,109,110 can hear an audio feed from each other participant 107,108,109,110 as well.

In this illustrative embodiment, participant 109 is acting as a presenter, and is speaking, noting that a friend, Buster, "says hello." The presenter's conferencing system terminal device 103 receives this audio and captures video of the presenter and transmits the same to the other conferencing system terminal devices 101,102,103 via the video conferencing system server complex 106. While participant 110 is the presenter at the moment, it is to be understood that the presenter role can be changed throughout the videoconference as well, with each other participant 107,108,110 taking the role of presenter at other times as situations warrant.

Figure 2:
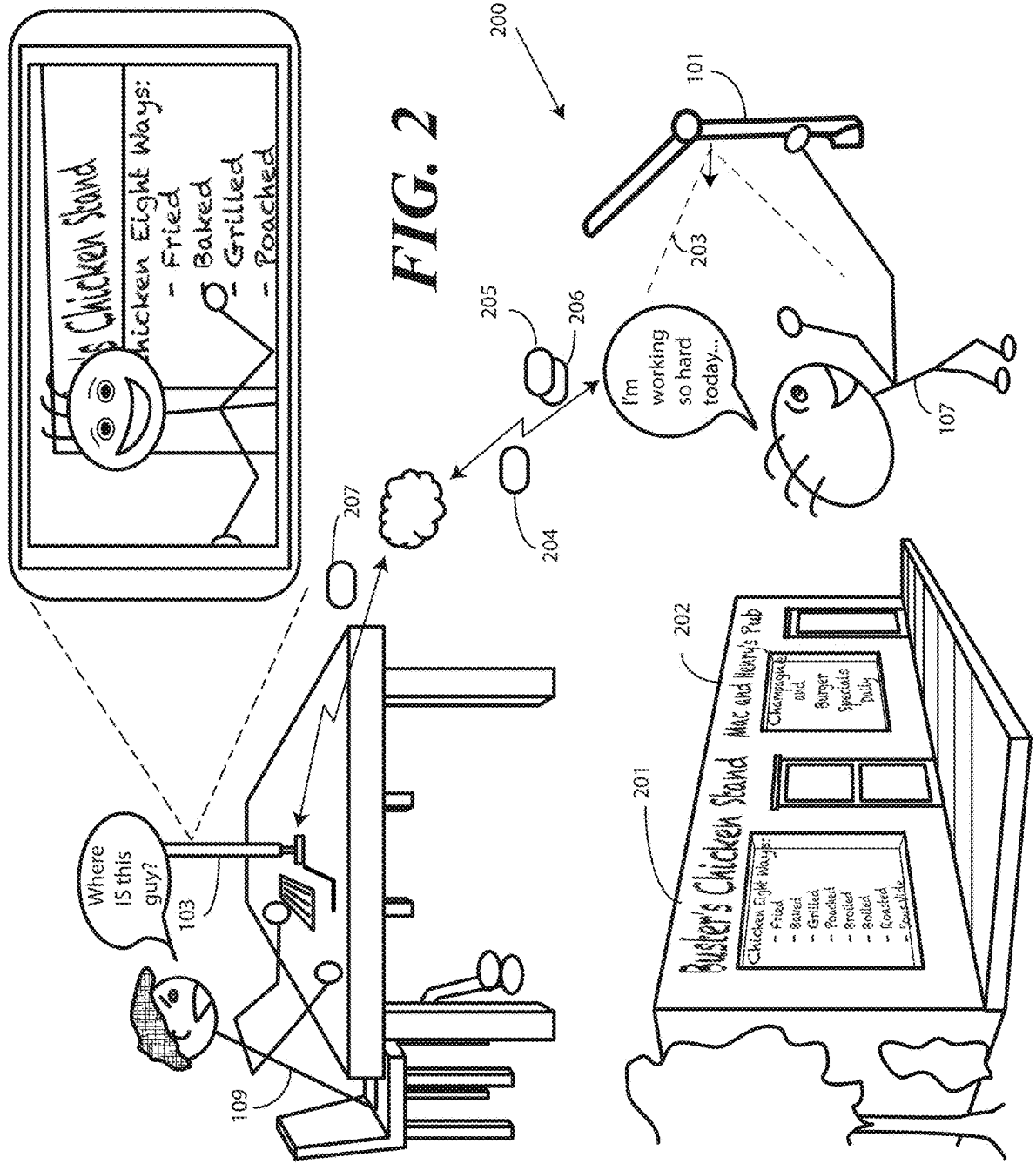
FIG. 2 illustrates portions of the conferencing system of FIG. 1 when video background indicia in the form of a virtual background is not applied to one explanatory videoconference feed.

Turning now to FIG. 2, illustrated therein is a portion 200 of the videoconference (100) of FIG. 1 illustrating an expanded view of participant 107 as he engages in the videoconference. As shown in FIG. 2, the participant 107 is on the go during work hours and, rather than being home in an office working, is instead standing in front of the legendary restaurant Buster's Chicken Stand 201, which is located next to Mac and Henry's Pub 202, and offers tasty chicken served eight different ways.

The field of view 203 of the participant's conferencing system terminal device 101 is wide enough that the video feed 204 being transmitted from the conferencing system terminal device 101 includes not only an image 205 of the participant, who is the subject of the video feed 204, but also a background image 206 of Buster's Chicken Stand 201. This allows participant 109 to instantly determine by viewing the video feed 204 on his conferencing system terminal device 103 that participant 107 is not at home working but is instead enjoying some of Buster's tasty treats and probably a tipple from Mac and Henry's Pub 202 as well. Where participant 109 is the supervisor of participant 107, this can be troublesome, to say the least.

To prevent such awkward situations, embodiments of the disclosure allow for the provision of virtual background indicia in images of a videoconference (100) behind a subject like participant 107. In one or more embodiments, the one or more processors of the conferencing system terminal device 101 apply the video background indicia to blur, replace, or obscure backgrounds behind a person's head and torso as these elements are detected by one or more sensors of the conferencing system terminal device 101. In one or more embodiments, the application of the video background indicia occurs during the videoconference (100) and prior to a communication device of the conferencing system terminal device 101 transmitting the images 205,206 to at least one remote electronic device (here conferencing system terminal device 103) engaged in the videoconference (100).

Illustrating by example, in one or more embodiments the communication device of the conferencing system terminal device 101 receives one or more videoconference feeds 207 depicting one or more subjects, e.g., participant 107, engaged in the videoconference (100) from one or more remote electronic devices, one example of which is conferencing system terminal device 103. One or more processors of the conferencing system terminal device 101 then apply video background indicia to at least one videoconference feed during the videoconference (100). Thereafter, a display of the conferencing system terminal device then presents the at least one videoconference feed after the video background indicia or the overlay indicia is applied.

Figure 3:
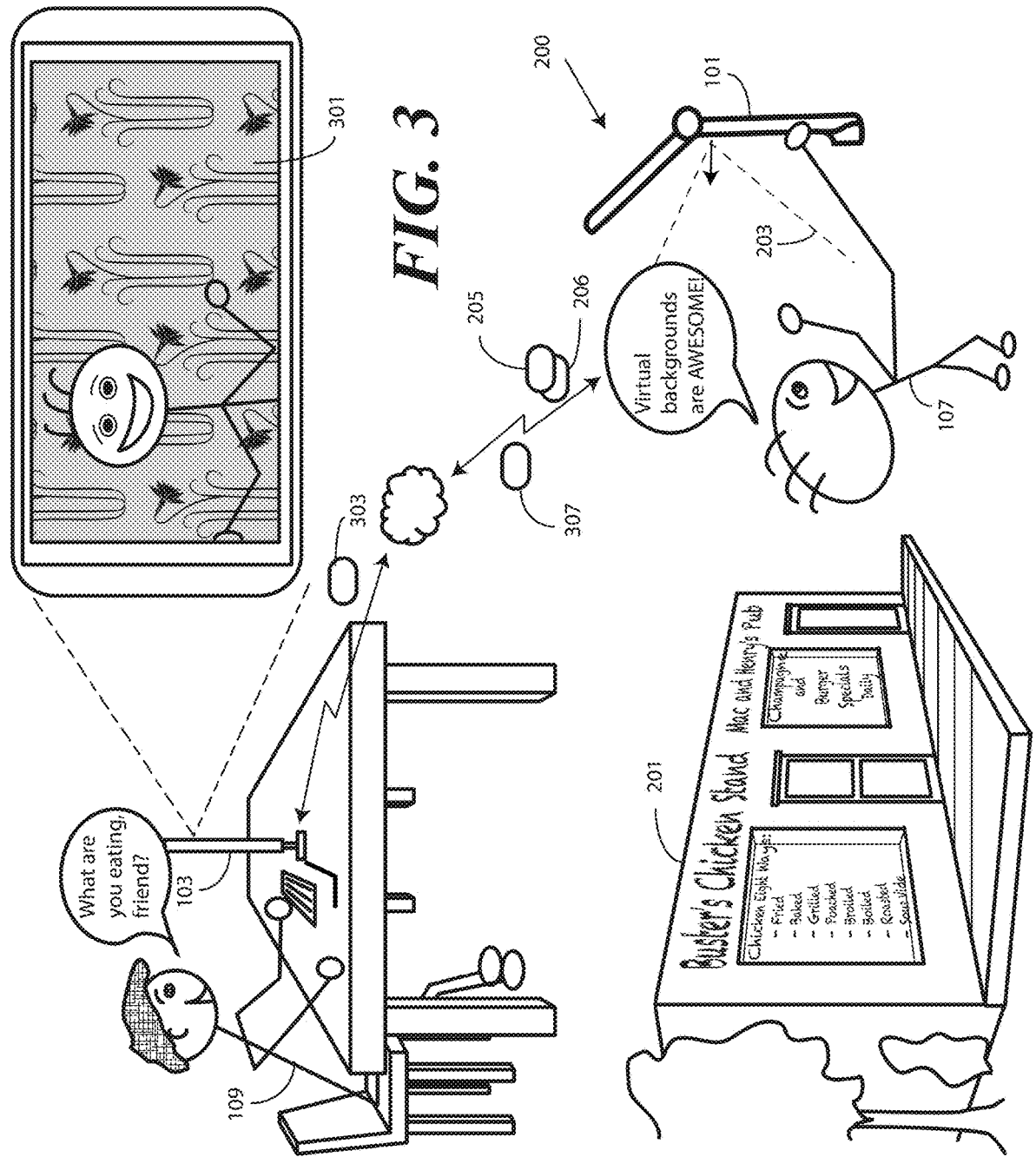
FIG. 3 illustrates one or more explanatory method steps suitable for implementation in one explanatory conferencing system configured in accordance with one or more embodiments of the disclosure to present background indicia in the form of a virtual background in one explanatory videoconference feed.

Turning now to FIG. 3, this has been done. The scene of FIG. 3 is similar to FIG. 2. However, in this situation participant 107 has an automatic and dynamic background and overlay system actuated in his conferencing system terminal device 101 while engaged in the videoconference (100) of FIG. 1. Illustrated therein is the portion 200 of the videoconference (100) of FIG. 1 again depicting the expanded view of participant 107 as he engages in the videoconference (100).

Once again, participant 107 is on the go during work hours and, rather than being home in an office working, is instead standing in front of the legendary restaurant Buster's Chicken Stand 201. The field of view 203 of the participant's conferencing system terminal device 101 is wide enough that the raw video feed that would be transmitted from the conferencing system terminal device 101 would include not only an image 205 of the participant, who is the subject of the video feed, but also a background image 206 of Buster's Chicken Stand 201, as was the case in FIG. 2.

In this illustrative embodiment, however, one or more processors of the conferencing system terminal device 101 execute a method in accordance with embodiments of the disclosure that provide for the provision of video background indicia defining a virtual background 301 in a modified video feed 303. In this illustrative embodiment, as the image capture device of the conferencing system terminal device 101 captures images 205 of the subject engaged in the videoconference (100) (here, participant 107) to be included in the video feed used in the videoconference (100), the one or more processors of the conferencing system terminal device 101 apply a virtual background 301 to portions of the images 205 to be included with the modified video feed 303 depicting objects other than the subject.

In this illustrative embodiment, the resulting background modified images 307 include the images 205 of the subject but use the virtual background 301 to obscure the background images 206 of Buster's Chicken Stand 201. Since the virtual background 301 is being applied in the modified video feed 303 to blur, obscure, or replace imagery depicting objects other than the subject, the virtual background 301 blocks out any visibility of Buster's Chicken Stand 201 when the modified video feed 303 is viewed by other participants, one example of which is participant 109. Accordingly, the background images 206 of Buster's Chicken Stand 201 are replaced with a virtual background 301 that resembles wallpaper.

In the illustrative embodiment of FIG. 3, the one or more processors of the conferencing apply the virtual background 301. However, in other embodiments this application can be performed on the receiving end. Illustrating by example, if a communication device of conferencing system terminal device 103 is receiving unmodified images, the virtual background 301 can be applied after receipt of these images and before they are presented locally on the display of conferencing system terminal device 103.

In one or more embodiments, presentation of the virtual background 301 is continuous during the duration of the videoconference (100). Embodiments of the disclosure contemplate that the participant 107 may want Buster's Chicken Stand 201 to be continually obscured during the videoconference (100) so that it looks as if he is diligently working rather than eating the delicious delicacies Buster prepares. However, in one or more embodiments the duration of the presentation of the video background indicia can be dictated by the participant 107 using one or more user settings of the conferencing system terminal device 101.

In one application of particular importance to the present disclosure, the presentation of the virtual background 301 can be temporarily and selectively disabled so that a demonstration object can be shown during a demonstration operation. As used herein, a "demonstration object" is an object that a participant in a videoconference desires to show to the other participants of the videoconference using the image capture device of their conferencing system terminal device during a demonstration operation. Thus, if participant 107 desired to show one of Buster's tasty chicken legs in a demonstration operation by picking it up and holding it in front of the camera of conferencing system terminal device 101 to make them ever so jealous, embodiments of the disclosure allow the presentation of the virtual background 301 to be temporarily suspended so that the chicken leg held in the hand of participant 107 could be seen against the virtual background 301.

If this were a prior art system, and the participant 107 wished to show such demonstration object, it would simply be blurred by the virtual background. Such a result is shown in FIG. 4.

Figure 4:
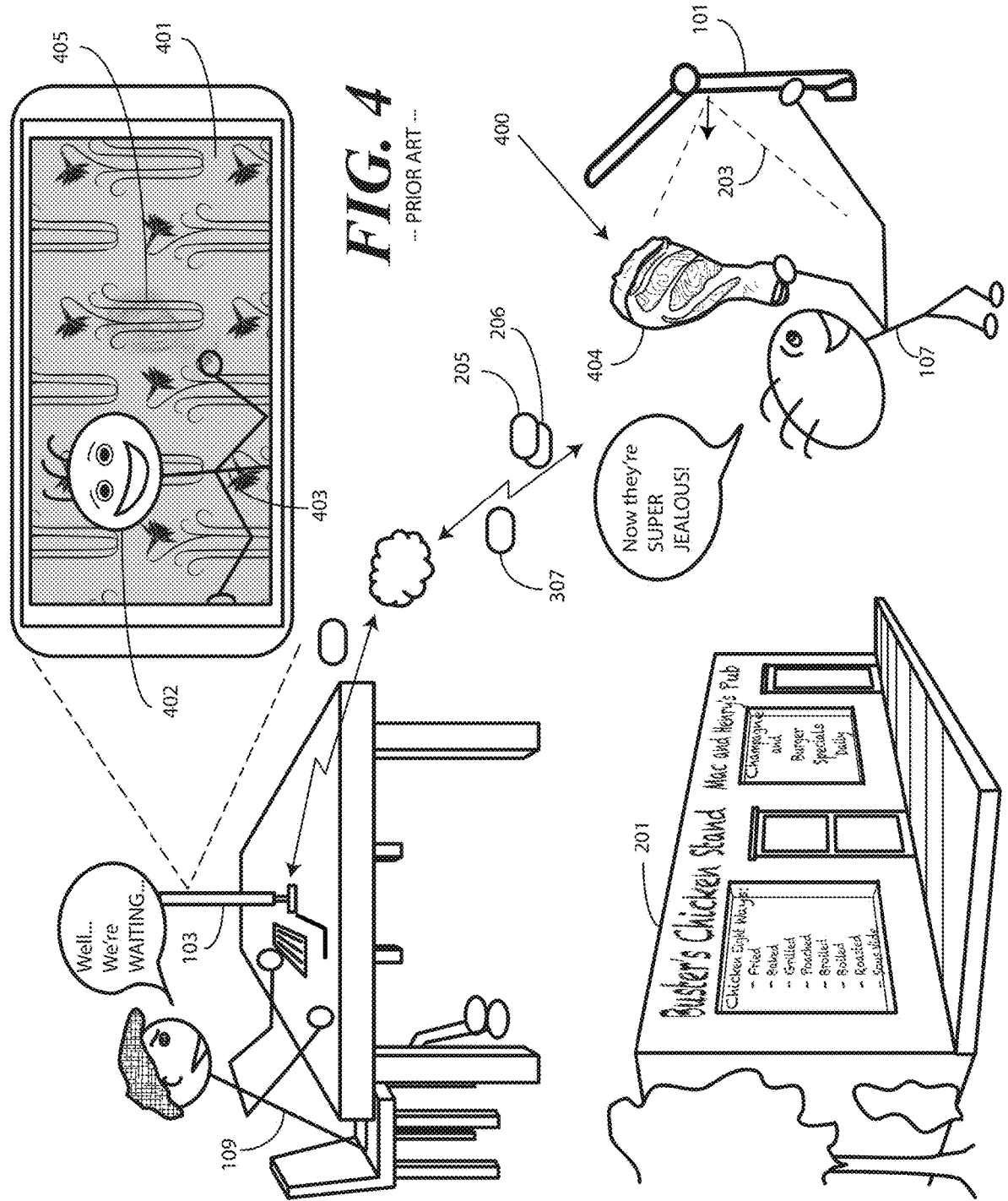
FIG. 4 illustrates a prior art conferencing system using a prior art virtual background.

Turning now to FIG. 4, participant 107 is engaged in a videoconference using a prior art videoconference system. As shown, the prior art videoconference system is presenting a virtual background 401 behind the participant so that the participant's head 402 and torso 403 can be seen. However, imagery of Buster's Chicken Stand 201 is obscured by the virtual background 401. Accordingly, participant 109 cannot ascertain that participant 107 is out dining at one of the tastiest restaurants on the planet.

In an effort to recreate the proverbial Pavlovian dog experiment, participant 107 decides to execute a demonstration operation 400 by picking up a demonstration object (which in this example is one of Buster's tasty chicken legs 404) and moving it into the field of view 203 of the conferencing system terminal device 101. The problem with this prior art videoconferencing system operating on the conferencing system terminal device 101 is that it blurs everything other than the participant's head 402 and torso 403. As such, it is not possible to demonstrate objects such as items held in a hand. As shown in this figure, the depiction 405 of the chicken leg 404 is completely blurred and cannot be seen by participant 109 due to the generic blurring effects of the prior art videoconferencing system. Accordingly, the best laid plans of participant 107 to make participant 109 salivate have been thwarted.

Advantageously, embodiments of the disclosure provide a solution to this problem by detecting, with one or more processors, a demonstration operation monitoring engine, or combinations thereof, the initiation of a demonstration operation for one or more videoconference feeds. This can occur in a variety of ways. In one or more embodiments, a camera is used as a sensor to identify a videoconference participant picking up a demonstration object and moving it to and/or within a field of view of the camera, thereby making the object a point of interest within that field of view.

In other embodiments, the audio signals being captured and transmitted during the videoconference are monitored to identify commands that indicate the initiation of a demonstration operation. Illustrating by example, a videoconference participant may say, "do you see this tasty chicken leg? I bet your mouth is watering now," while moving the chicken leg into the field of view of a camera to indicate that a demonstration operation using the chicken leg as the demonstration object will commence.

In still other embodiments, a de-blurred preview mode to a videoconference participant. This preview mode automatically identifies and tags videoconference participants and objects such as faces, torsos, dogs, cats, chicken legs, electronic devices, charts, figures, models, and other demonstration objects within the field of view of a camera. A videoconference participant can then select which of these objects are the demonstration object so that the demonstration operation monitoring engine can unblur the same.

Figure 5:
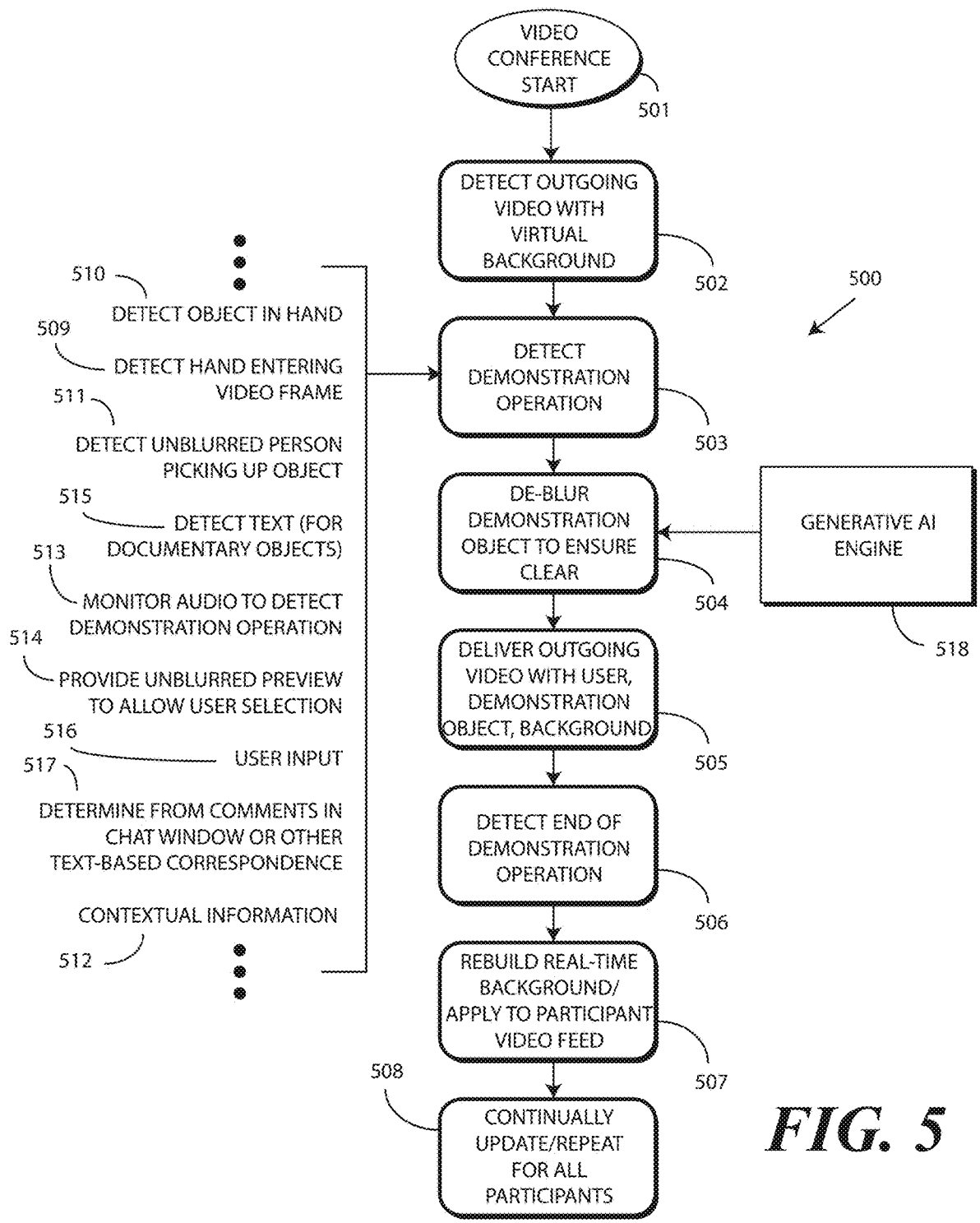
FIG. 5 illustrates one explanatory method in accordance with one or more embodiments of the disclosure.

In one or more embodiments, once the initiation of a demonstration operation for one or more videoconference feeds is detected, one or more processors, a demonstration operation monitoring engine, or combinations thereof can apply a virtual background to a particular videoconference feed that depicts the demonstration operation to create one or more modified background videoconference feeds where the demonstration object of the demonstration operation is visible against the virtual background. This deblurs not only the user, but the demonstration object of the demonstration operation as well. Advantageously, a person can intuitively and quickly unblur a demonstration object by signaling that a demonstration operation will begin in a natural and conversational manner. The person can also cause the demonstration operation to become unblurred without diverting from their presentation, thoughts, or comments. Turning now to FIG. 5, illustrated therein is one explanatory method 500 illustrating how this can occur.

Beginning at stage 501, a videoconference is initiated. In one or more embodiments, the videoconference occurs across a network, one example of which is network (105) shown in FIG. 1. In one or more embodiments, the videoconference includes one or more videoconference feeds associated therewith. These videoconference feeds can include audio content and/or video content. The features described in conjunction with the method 500 of FIG. 5 using this video content and/or audio content could be performed in a conferencing system terminal device engaged in the videoconference initiated at stage 501 or, alternatively, by a videoconferencing server complex facilitating the videoconference initiated at stage 501.

In one or more embodiments, the initiation of the videoconference at stage 501 means that image capture devices of conferencing system terminal devices engaged in the videoconference begin capturing images of subjects participating in the videoconference. A communication device of the conferencing system terminal device then transmits the images to at least one remote electronic device engaged in the videoconference, optionally in conjunction with the operations of a conferencing system server complex facilitating the videoconference. Communication devices of those remote electronic devices receive one or more videoconference feeds, each of which can include an audio feed and a video feed, depicting the one or more subjects engaged in the videoconference from the other conferencing system terminal devices engaged in the videoconference.

As will be explained in more detail below with reference to FIG. 7, in one or more embodiments each conferencing system terminal device engaged in the videoconference includes an image capture device, a communication device, one or more sensors, and one or more processors. These conferencing system terminal devices can also include a contextual information extraction engine that is configured to extract contextual information from the audio content and/or video content associated with the audio and video feeds of the videoconference, respectively. The conferencing system terminal devices can also be equipped with a contextual information monitoring engine that monitors video or audio feeds for contextual information as well. Other components that can be included with the conferencing system terminal device will be described below with reference to FIG. 7. Still others will be obvious to those of ordinary skill in the art having the benefit of this disclosure.

In one or more embodiments, the conferencing system terminal device engaged in the videoconference occurring at stage 501 includes an image capture device capturing images of a subject during the videoconference occurring across a network. A communication device transmits the images to at least one remote electronic device engaged in the videoconference at stage 501.

At step 502, the method 500 determines that a videoconference participant is actively engaged in a videoconference with their outgoing video feed turned ON. At step 502, the conferencing system terminal device engaged in the videoconference includes one or more sensors and one or more processors. The one or more processors apply virtual background indicia defining a virtual background in the images behind depictions of the subject. At step 502, the method determines that one or more participants are employing this virtual background indicia to blur, replace, or obscure the actual background. In one or more embodiments, the virtual background applied at step 502 initially blurs everything but the head and torso of the videoconference participant.

At step 503, the one or more sensors of the conferencing system terminal device detect initiation of a demonstration operation by a participant. Said differently, at step 503 the method 500 then detects a demonstration operation commencing. This can occur in a variety of ways.

In one or more embodiments, the one or more sensors detect the initiation of the demonstration operation at step 502 by detecting a hand 509 of a participant moving into the field of view 509 of an image capture device of their conferencing system terminal device. In another embodiment, the one or more sensors detect the initiation of the demonstration operation at step 502 by detecting a hand of a participant holding an object 510 moving into a field of view of an image capture device of their conferencing system terminal device. In still other embodiments, the one or more sensors detect the initiation of the demonstration operation at step 502 by detecting a hand of a participant picking up 511 an object and moving the object within the field of view of an image capture device of their conferencing system terminal device.

In other embodiments, the one or more sensors detect the initiation of the demonstration operation at step 502 by detecting contextual information 512. In one or more embodiments, the contextual information 512 is detected during the videoconference and prior to the communication device of the conferencing system terminal device transmitting any images to any remote electronic device engaged in the videoconference.

Illustrating by example, in one or more embodiments the contextual information 512 comprises audio content 513 received by the one or more sensors comprising an indication that the demonstration operation will commence. Audio processing techniques can then be used to process this audio content to determine if a participant makes comments indicative of, or identifying, the commencement of a demonstration operation. A participant may say, "hold on, let me show you this," or "look at this [insert noun of demonstration operation], I've got it right here in my hand," or "let me grab this [widget or other demonstration operation name" and I'll show it to you and so forth. These examples are illustrative other, as many other voice commands identifying or indicating the commencement of a demonstration operation using a demonstration object will be obvious to those of ordinary skill in the art having the benefit of this disclosure.

Accordingly, one or more processors of either a conferencing system terminal device or a conferencing system server complex begin a speech capture operation at step 502.

In one or more embodiments a videoconferencing system supports speech detection and, optionally, audio transcription. In one or more embodiments, the one or more videoconference feeds associated with the videoconference that commences at stage 501 each have audio content associated therewith. One or more sensors of each conferencing system terminal device, one example of which is a microphone, or alternatively one or more sensors of a conferencing system server complex, capture the audio content from the one or more videoconference feeds associated with the videoconference at step 502.

The captured audio content can be analyzed and/or transcribed. Illustrating by example, where a conferencing system terminal device is equipped with a contextual information extraction engine, the contextual information extraction engine can extract contextual information of the videoconference from the one or more videoconference feeds by extracting the contextual information from transcribed audio content at step 502. Moreover, one or more processors of the conferencing system terminal device can transcribe the audio content to create transcribed audio content at step 502. Where the transcription is occurring in a conferencing system server complex instead of a conferencing system terminal device, step 502 can include a contextual information monitoring engine identifying contextual information from the transcribed audio content as well. In one or more embodiments, one or more processors of the conferencing system terminal device or the videoconferencing server complex then perform operations to extract contextual information from the transcription of the speech present in the audio feed of the videoconference at step 502 to identify the commencement of a demonstration operation.

In still other embodiments where the conferencing system terminal device includes a display, one or more processors of the conferencing system terminal device may present an unblurred preview mode on the display that allows a user selection of the demonstration object. In one or more embodiments, this preview mode is presented prior to causing the virtual background indicia defining the virtual background to appear behind the depictions of the demonstration object of the demonstration operation.

In one or more embodiments, the demonstration object comprises a document or other substrate upon which text is presented. In such embodiments, the one or more sensors detect the initiation of the demonstration operation at step 502 by detecting text entering, moving, or appearing within the field of view of an image capture device of the conferencing system terminal device.

Thus, the one or more sensors detect the initiation of the demonstration operation at step 502 by, for example, using a camera sensor to identify the videoconference participant picking up a demonstration object and moving it in front of the image capture device to indicate that the demonstration object is a point of interest, by using audio processing techniques to process received audio input indicating an intention to initiate a demonstration operation, or by providing a deblurred preview 514 of any detected objects to the videoconference participant so that the participant can select an object to be deblurred as a demonstration object.

Other techniques can be used as well to detect the commencement of a demonstration operation. Just as audio content can be monitored at step 502 to detect the demonstration operation, contextual information can be monitored, identified, or extracted from the video content associated with the videoconference commencing at stage 501. Illustrating by example, one or more sensors of a conferencing system terminal device can detect contextual information from the video feeds associated with the videoconference at step 502. User input 516 received from a user interface can indicate the commencement of a demonstration operation, as can information from other communication channels, such as comments placed into a chat window 517 or other text-based correspondence. Text 515 detected from a document presented within the field of view of an image capture device can be used as well.

In one or more embodiments, in response to the one or more sensors detecting initiation of a demonstration operation by the subject at step 503, at step 504 the one or more processors cause the virtual background indicia to appear behind depictions of a demonstration object of the demonstration operation such that the demonstration object is visible against the virtual background indicia in the images transmitted to the at least one remote electronic device engaged in the videoconference. This results in the virtual background indicia obscuring portions of the images depicting objects other than the subject and the demonstration object.

Advantageously, by automatically deblurring a demonstration object within the video background indicia in a videoconference feed at step 504, embodiments of the disclosure automatically and dynamically allow a videoconference participant to intuitively show demonstration objects to others. Other advantages will be described below. Still others will be obvious to those of ordinary skill in the art having the benefit of this disclosure.

Step 504 can include generating the video background indicia defining the virtual background. Again, the operations of step 504 could be performed in a conferencing system terminal device engaged in the videoconference initiated at stage 501 or, alternatively, by a videoconferencing server complex facilitating the videoconference initiated at stage 501.

In one or more embodiments, step 504 comprises causing the virtual background indicia defining the virtual background to appear behind the depictions of the demonstration object of the demonstration operation such that the demonstration object is visible against the virtual background indicia in the images transmitted to the at least one remote electronic device engaged in the videoconference. In one or more embodiments, step 504 comprises one or more processors of a conferencing system terminal device applying a virtual background to portions of the images depicting objects other than the subject and the demonstration object such that both the subject and the demonstration object are visible against the virtual background in the images.

Where the conferencing system terminal device includes a demonstration operation monitoring engine, step 504 can comprise one or more processors of the conferencing system terminal device generating a virtual background in response to the demonstration operation monitoring engine detecting initiation of a demonstration operation for one or more videoconference feeds received from one or more conferencing system terminal devices of a plurality of conferencing system terminal devices, applying the virtual background to the one or more videoconference feeds to create one or more modified background videoconference feeds in which a demonstration object of the demonstration operation is visible against the virtual background.

Where the demonstration operation is detected at step 503 using user input 516 prior to the deblurring at step 504, the deblurring occurring at step 504 can comprise causing the virtual background indicia to appear behind the depictions of the demonstration object of the demonstration operation. This results in the demonstration object being visible against the virtual background indicia when the images are transmitted to the at least one remote electronic device engaged in the videoconference at step 505.

The one or more processors of the conferencing system terminal device and/or conferencing system server complex may optionally employ a generative artificial intelligence engine 518 to cause the virtual background to allow the demonstration object of the demonstration operation to be seen as well. In one or more embodiments, one or both of the conferencing system terminal devices engaged in the videoconference initiated at stage 501 and/or the conferencing system server complex facilitating the videoconference initiated at stage 501 are equipped with a generative artificial intelligence engine 518 that includes an artificial neural network or other similar technology that detects the contextual information and generates, as a function of this contextual information, video background indicia and/or virtual backgrounds for application to one or more video feeds associated with the videoconference initiated at stage 501 that allow a demonstration object of a demonstration operation to be seen against the virtual background indicia or virtual backgrounds.

Regardless of whether a generative artificial intelligence engine 518 is used, the result of step 504 is that one or more processors, in response to the one or more sensors detecting initiation of a demonstration operation by the subject at step 503, cause the virtual background indicia or virtual background to appear behind depictions of a demonstration object of the demonstration operation such that the demonstration object is visible against the virtual background indicia in the images transmitted at step 505 to the at least one remote electronic device engaged in the videoconference. The virtual background indicia or virtual background therefore obscures portions of the images depicting objects other than the subject and the demonstration object.

At step 506, the method 500 detects a cessation of the demonstration operation. At step 507, the method 500 the method 500 again applies the virtual background indicia or virtual background in the images behind the subject such that the subject's torso and head are visible, but all other portions of the images are blurred, obscured, or replaced. At step 508, the method 500 can repeat as additional demonstration operations or demonstration objects are detected.

Figure 6:
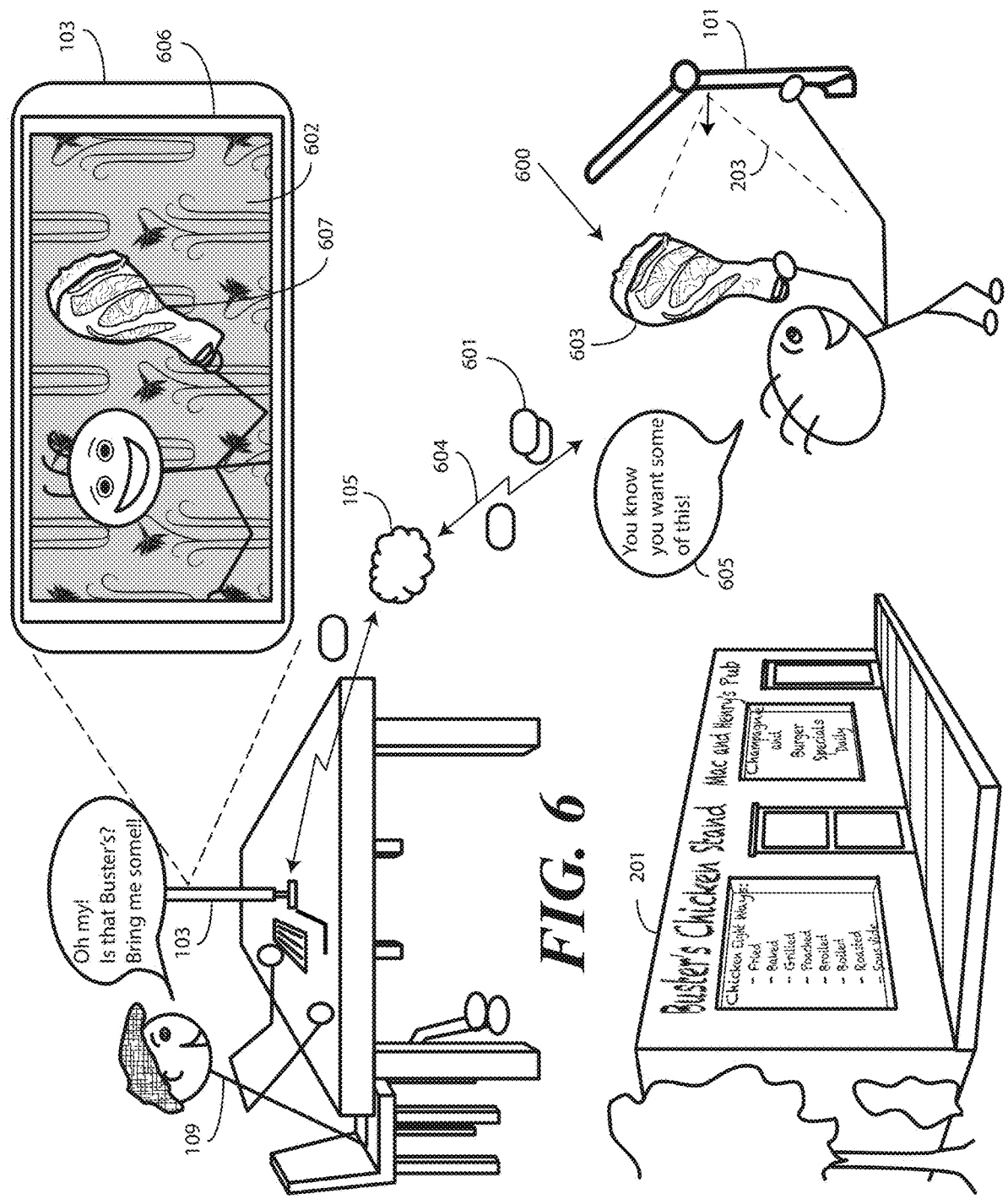
FIG. 6 illustrates one explanatory conferencing system, along with one or more method steps for presenting a demonstration object during a demonstration operation, in accordance with one or more embodiments of the disclosure.

Turning now to FIG. 6, illustrated therein is one explanatory result of the operations described above with reference to the method of FIG. 5. As shown, one or more processors of a conferencing system terminal device 101 executing a method in accordance with embodiments of the disclosure and as described above with reference to FIG. 5 identifies the initiation of a demonstration operation 600 occurring during a videoconference. An image capture device of the conferencing system terminal device 101 captures images 601 of a subject, which in this illustration is the participant 107 of the videoconference using the conferencing system terminal device 101.

The one or more processors then apply a virtual background 602 to portions of the images 601 depicting objects other than the subject and the demonstration object 603 such that both the subject and the demonstration object 603 are visible against the virtual background 602 in the images 601. A communication device of the conferencing system terminal device 101 operable with the one or more processors then transmits 604 the images across a network 105 to another conferencing system terminal device 103 engaged in the videoconference.

In this example, which is in contrast to the prior art situation shown above in FIG. 4, participant 107 announces that the demonstration operation 600 is about to commence by saying, "you know you want some of this," with the "this" indicating that the demonstration object 603 will enter the field of view 203 of the image capture device. Accordingly, one or more sensors of the conferencing system terminal device 101 capture audio from an environment of the conferencing system terminal device 101 and identify the statement 605 indicating that the demonstration operation 600 will commence.

Had the participant 107 not uttered this statement 605, the one or more processors could have alternatively detected the commencement of the demonstration operation 600 when the image capture device captured images of the participant 107 picking up the demonstration object 603, which in this example is one of Buster's tasty chicken legs (404) and moving it into and/or within the field of view 203 of the image capture device. In other embodiments, the one or more sensors could detect a statement indicating commencement of the demonstration operation 600 from text-based correspondence occurring in the videoconference. As noted above, user input received at a user interface of the conferencing system terminal device identifying the demonstration object 603 could be used as well.

As shown on the display 606 of conferencing system terminal device 103, a depiction 607 of the chicken leg (404) appears clearly and plainly against the virtual background 602. This makes participant 109 very hungry indeed. Moreover, the depiction 607 of the chicken leg (404) also appears clearly without revealing any portion of the actual background behind the subject, which is Buster's Chicken Stand 201. By keeping the background perfectly concealed and by revealing only the subject and the demonstration object 603, participant 109 is unaware that participant 107 is out and about. Instead, participant 109 just presumes the demonstration object 603 is a leftover and that participant 107 is working hard in the office. Accordingly, in addition to revealing the demonstration object 603, embodiments of the disclosure protect the privacy of the subject by keeping all portions of the background visible within the field of view 203 other than the subject and the demonstration object 603 concealed.

Figure 7:
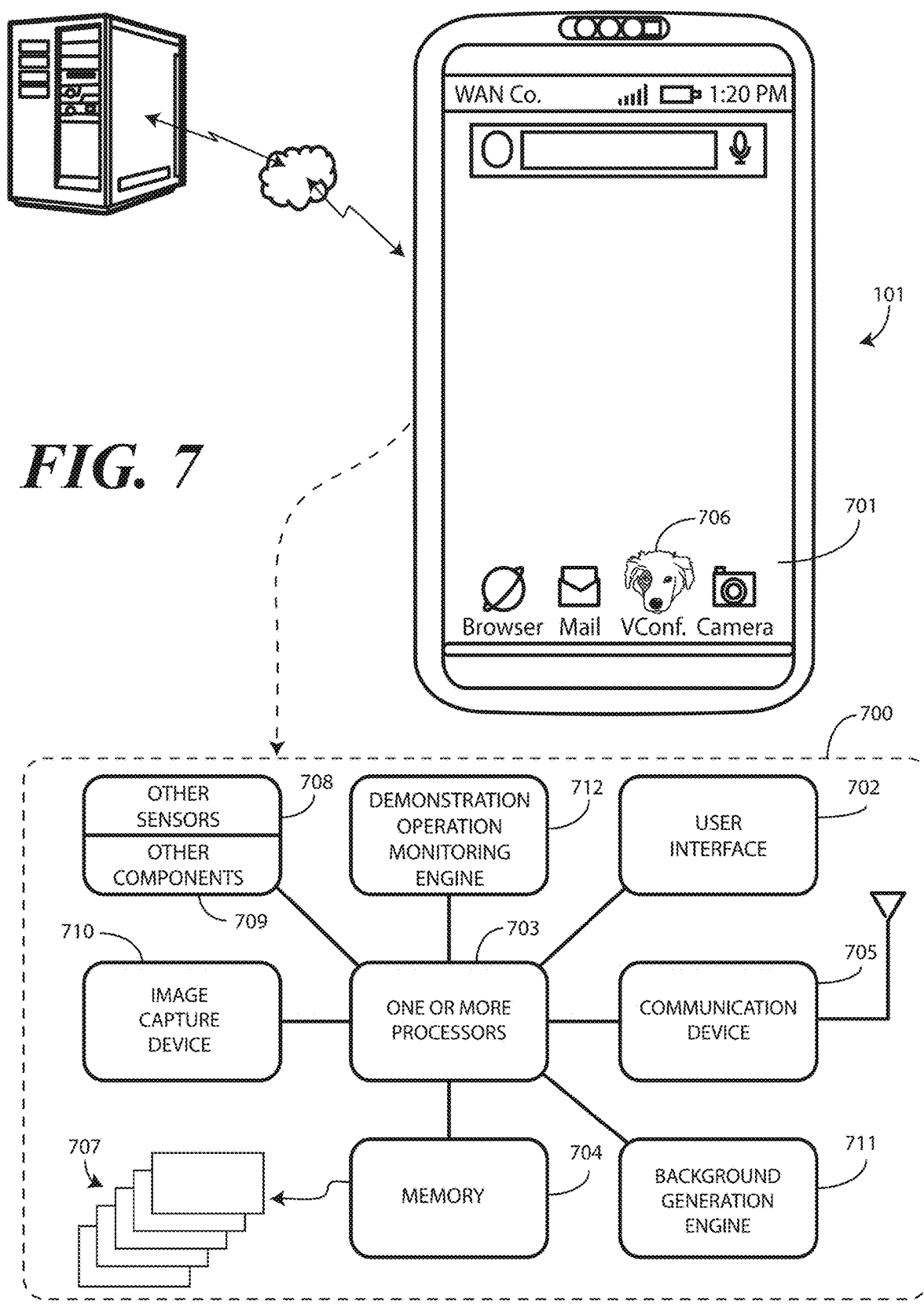
FIG. 7 illustrates one explanatory conferencing system terminal device in accordance with one or more embodiments of the disclosure.

Turning now to FIG. 7, illustrated therein is one explanatory conferencing system terminal device 101. The conferencing system terminal device 101 of FIG. 7 is a portable electronic device. For illustrative purposes, the conferencing system terminal device 101 is shown as a smartphone. However, the conferencing system terminal device 101 could be any number of other devices as well, including tablet computers, desktop computers, notebook computers, and so forth. Still other types of conferencing system terminal devices can be configured in accordance with one or more embodiments of the disclosure as will be readily appreciated by those of ordinary skill in the art having the benefit of this disclosure.

This illustrative conferencing system terminal device 101 includes a display 701, which may optionally be touch-sensitive. In one embodiment where the display 701 is touch-sensitive, the display 701 can serve as a primary user interface 702 of the conferencing system terminal device 101. Users can deliver user input to the display 701 of such an embodiment by delivering touch input from a finger, stylus, or other objects disposed proximately with the display 701.

In one embodiment, the display 701 is configured as an active-matrix organic light emitting diode (AMOLED) display. However, it should be noted that other types of displays, including liquid crystal displays, would be obvious to those of ordinary skill in the art having the benefit of this disclosure. Where the conferencing system terminal device 101 is configured with a keyboard and/or mouse, such as when the conferencing system terminal device 101 is configured as a computer, the keyboard and/or mouse can serve as the primary user interface 702.

A block diagram schematic 700 of the conferencing system terminal device 101 is also shown in FIG. 7. The block diagram schematic 700 can be configured as a printed circuit board assembly disposed within the device housing of the conferencing system terminal device 101. Various components can be electrically coupled together by conductors or a bus disposed along one or more printed circuit boards.

In one or more embodiments, the conferencing system terminal device 101 includes one or more processors 703. In one embodiment, the one or more processors 703 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the conferencing system terminal device 101. Each of the application processor and the auxiliary processor(s) can be configured to process and execute executable software code to perform the various functions of the conferencing system terminal device 101. A storage device, such as memory 704, can optionally store the executable software code used by the one or more processors 703 during operation.

The conferencing system terminal device 101 also includes a communication device 705 that can be configured for wired or wireless communication with one or more other devices or networks. The networks can include a wide area network, a local area network, and/or personal area network. The communication device 705 may also utilize wireless technology for communication, such as, but are not limited to, peer-to-peer or ad hoc communications such as HomeRF, Bluetooth and IEEE 802.11, and other forms of wireless communication such as infrared technology. The communication device 705 can include wireless communication circuitry, one of a receiver, a transmitter, or transceiver, and one or more antennas.

In one embodiment, the one or more processors 703 can be responsible for performing the primary functions of the conferencing system terminal device 101. For example, in one embodiment the one or more processors 703 comprise one or more circuits operable with one or more user interface devices, which can include the display 701, to engage in videoconferences by transmitting, receiving, and presenting images, video, or other presentation information. The executable software code used by the one or more processors 703, including that associated with a videoconference application 706, can be configured as one or more modules 707 that are operable with the one or more processors 703. Such modules 707 can store instructions, control algorithms, logic steps, and so forth.

In one embodiment, the one or more processors 703 are responsible for running the operating system environment of the conferencing system terminal device 101. The operating system environment can include a kernel and one or more drivers, and an application service layer, and an application layer. The operating system environment can be configured as executable code operating on one or more processors or control circuits of the conferencing system terminal device 101. The application layer can be responsible for executing application service modules. The application service modules may support one or more applications or "apps," such as the videoconference application 706. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the one or more processors 703 may generate commands or execute control operations based upon user input received at the user interface 702. Moreover, the one or more processors 703 may process the received information alone or in combination with other data, such as the information stored in the memory 704.

The conferencing system terminal device 101 can include one or more sensors 708. The one or more sensors 708 may include a microphone, an earpiece speaker, and/or a second loudspeaker. The one or more other sensors 708 may also include touch actuator selection sensors, proximity sensors, a touch pad sensor, a touch screen sensor, a capacitive touch sensor, and one or more switches. Touch sensors may used to indicate whether any of the user actuation targets present on the display 701, including the audio difficulties user actuation targets described above, are being actuated. The other sensors 708 can also include audio sensors and video sensors (such as a camera).

Other components 709 operable with the one or more processors 703 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 709 can also include an audio input/processor. The audio input/processor can include hardware, executable code, and speech monitor executable code in one embodiment. The audio input/processor can include, stored in memory 704, basic speech models, trained speech models, or other modules that are used by the audio input/processor to receive and identify voice commands that are received with audio input captured by an audio input/processor, one example of which is a microphone of the one or more sensors 708. In one embodiment, the audio input/processor can include a voice recognition engine. Regardless of the specific implementation utilized in the various embodiments, the audio input/processor can access various speech models to identify speech commands in one or more embodiments.

To capture video during a videoconference, in one or more embodiments the conferencing system terminal device 101 includes an imager 710 or another image capture device. The conferencing system terminal device 101 can optionally include a depth imager as well.

In one embodiment, the imager 710 comprises a two-dimensional imager configured to receive at least one image of a person within an environment of the conferencing system terminal device 101. In one embodiment, the imager 710 comprises a two-dimensional RGB imager. In another embodiment, the imager 710 comprises an infrared imager. Other types of imagers suitable for use as the imager 710 of the conferencing system terminal device 101 will be obvious to those of ordinary skill in the art having the benefit of this disclosure.

In one or more embodiments, the conferencing system terminal device 101 includes a background engine 711. The conferencing system terminal device 101 can also include a demonstration operation monitoring engine 712. In one or more embodiments, the background engine 711 and/or demonstration operation monitoring engine 712 is operable with the one or more processors 703. In some embodiments, the one or more processors 703 can control the background engine 711 and/or demonstration operation monitoring engine 712. In other embodiments, the background engine 711 and/or demonstration operation monitoring engine 712 can operate independently, sensing contextual information from the one or more sensors 708 and/or receiving or identifying contextual information from remote servers and electronic devices using the communication device 705 to the one or more processors 703. The background engine 711 and/or demonstration operation monitoring engine 712 can receive data from the various sensors 708. In one or more embodiments, the one or more processors 703 are configured to perform the operations of the background engine 711 and/or demonstration operation monitoring engine 712.

In one or more embodiments, the background engine 711 automatically applies virtual background indicia to images of a video feed of a videoconference. In one or more embodiments, the background engine 711 automatically applies these video background indicia behind the subject of the images. Additionally, when a demonstration object is detected, the background engine 711 applies the virtual background indicia behind the demonstration object as well so that the demonstration object can be seen against the virtual background indicia.

In one or more embodiments, the background engine 711 automatically applies these video background indicia prior to the communication device 705 transmitting the images to other conferencing system terminal devices participating in the videoconference. Thereafter, the communication device 705 can transmit the (now) contextually background modified images to other conferencing system terminal devices engaged in the videoconference. In other embodiments, the background engine 711 applies the video background indicia to images received from other conferencing system terminal devices participating in the videoconference.

The background engine 711 and/or demonstration operation monitoring engine 712 can be operable with the various sensors 708 to detect, infer, capture, and otherwise determine persons, actions, demonstration operations, and other contextual information that are occurring in an environment about the conferencing system terminal device 101. For example, where included one embodiment of the background engine 711 and/or demonstration operation monitoring engine 712 determines that a demonstration operation is occurring based upon assessed contexts and frameworks using adjustable algorithms of context assessment employing information, data, and events. These assessments may be learned through repetitive data analysis. These assessments can be used to obtain additional contextual information when the contextual information changes in one or more embodiments. The background engine 711 and/or demonstration operation monitoring engine 712 can comprise an artificial neural network or other similar technology in one or more embodiments.

In one or more embodiments, the demonstration operation monitoring engine 712 is operable to detect the initiation of a demonstration operation for one or more videoconference feeds received from one or more conferencing system terminal devices. Thereafter, the background engine 711 can generate a virtual background in response to the demonstration operation monitoring engine 712 detecting initiation of a demonstration operation. The one or more processors 703 can then apply the virtual background to the one or more videoconference feeds to create one or more modified background videoconference feeds in which a demonstration object of the demonstration operation is visible against the virtual background. The communication device 705 can then deliver the one or more modified background videoconference feeds to other conferencing system terminal devices.

In one or more embodiments, the demonstration operation monitoring engine 712 detects the initiation of the demonstration operation from audio associated with the one or more videoconference feeds. In other embodiments, the demonstration operation monitoring engine 712 detects the initiation of the demonstration operation by detecting depictions of a hand holding the demonstration object in the one or more videoconference feeds. In still other embodiments, the demonstration operation monitoring engine 712 detects the initiation of the demonstration operation from user input received at the user interface 702 that identifies the demonstration object.

As will be shown with reference to FIG. 11 below, in one or more embodiments the one or more processors 703 and/or demonstration operation monitoring engine 712 can present, at the user interface 702 of the conferencing system terminal device 101, images captured by the imager 710 without any virtual background applied. This allows a user of the conferencing system terminal device 101 to select a demonstration object to be unblurred in the one or more modified background videoconference feeds. When the one or more processors receive a user selection identifying the demonstration object at the user interface from the images without the virtual background, the one or more processors 703 can apply the virtual background created by the background engine 711 such that the demonstration object is visible against the virtual background. The demonstration operation monitoring engine 712 can also detect the initiation of a demonstration operation from text-based correspondence occurring in a videoconference when that text-based correspondence indicates commencement of the demonstration operation as well.

It is to be understood that FIG. 7 is provided for illustrative purposes only and for illustrating components of one conferencing system terminal device 101 in accordance with embodiments of the disclosure and is not intended to be a complete schematic diagram of the various components required for an electronic device. Therefore, other conferencing system terminal devices in accordance with embodiments of the disclosure may include various other components not shown in FIG. 7 or may include a combination of two or more components or a division of a particular component into two or more separate components, and still be within the scope of the present disclosure.

Figure 8:
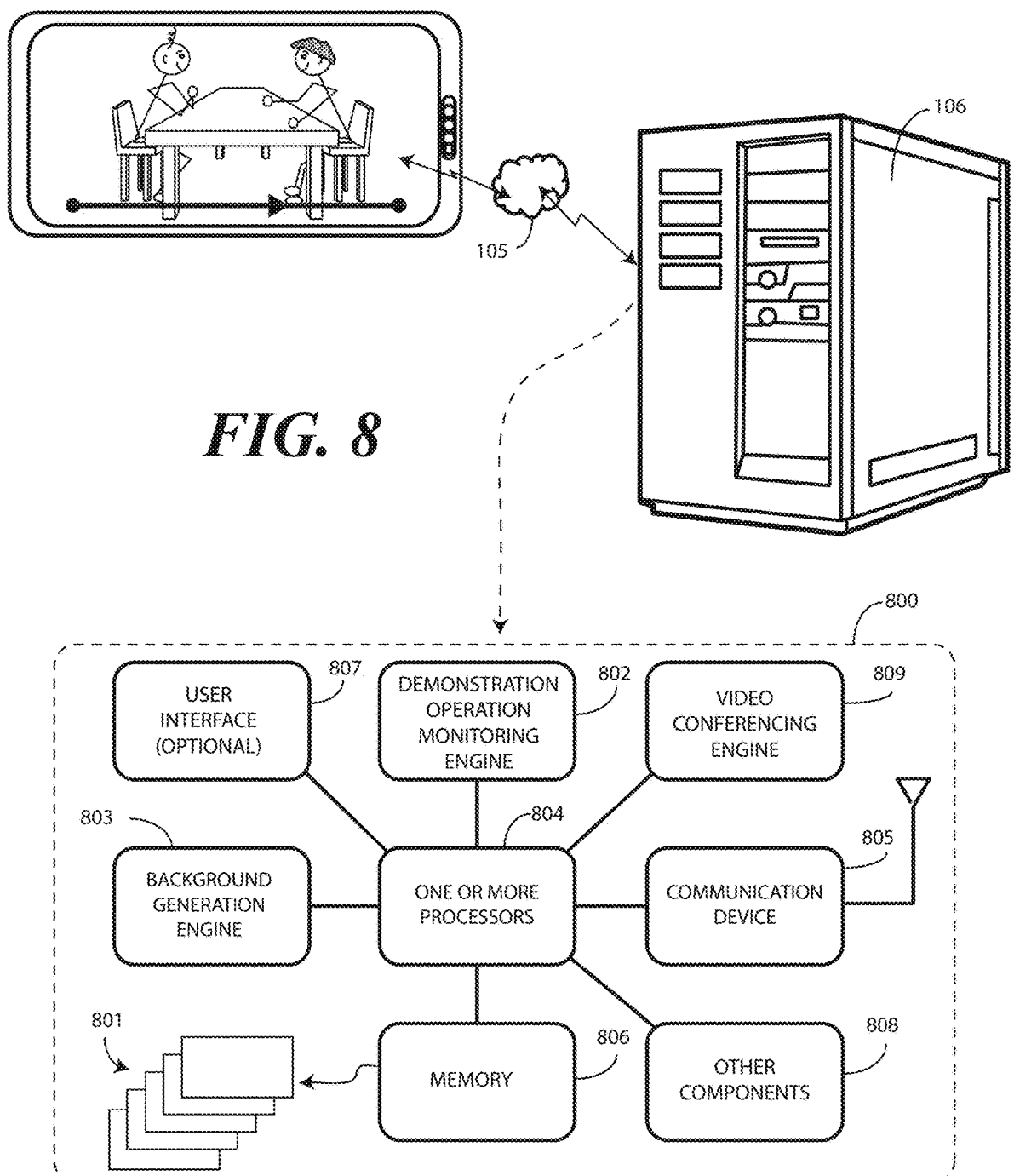
FIG. 8 illustrates one explanatory conferencing system server complex in accordance with one or more embodiments of the disclosure.

Turning now to FIG. 8, illustrated therein is one explanatory video conferencing system server complex 106 configured in accordance with one or more embodiments of the disclosure. An illustrative schematic block diagram 800 is also shown in FIG. 8.

As with the block diagram schematic (700) of FIG. 7, it is to be understood that the schematic block diagram 800 of FIG. 8 is provided for illustrative purposes only and for illustrating components of one explanatory server complex 106 configured in accordance with one or more embodiments of the disclosure. Accordingly, the components shown in either FIG. 7 or FIG. 8 are not intended to be complete schematic diagrams of the various components required for a particular device, as other devices configured in accordance with embodiments of the disclosure may include various other components not shown in FIG. 7 or FIG. 8. Alternatively, other server complexes or conferencing system terminal devices configured in accordance with embodiments of the disclosure or may include a combination of two or more components or a division of a particular component into two or more separate components, and still be within the scope of the present disclosure.

In one or more embodiments the conferencing system server complex 106 can be configured with performing processor-intensive methods, operations, steps, functions, or procedures associated with the presentation, actuation, and management of dynamic, automatic, and real time video background indicia and overlay indicia during a videoconference. Illustrating by example, the conferencing system server complex 106 can be configured to receive one or more images 801 in a video feed of a videoconference across a network 105.

A demonstration operation monitoring engine 802 can then detect the initiation of a demonstration operation from the one or more images received from one or more conferencing system terminal devices. Thereafter, the background engine 803 can generate a virtual background in response to the demonstration operation monitoring engine 802 detecting initiation of a demonstration operation. The one or more processors 804 can then apply the virtual background to the one or more videoconference feeds to create one or more modified background videoconference feeds in which a demonstration object of the demonstration operation is visible against the virtual background. The communication device 805 can then deliver the one or more modified background videoconference feeds to other conferencing system terminal devices.

The demonstration operation monitoring engine 802 can detect the initiation of the demonstration operation from any of the various techniques described above, including those described with reference to step (503) of FIG. 5, and including from audio associated with the one or more videoconference feeds. Other such techniques include detecting depictions of a hand holding the demonstration object in the one or more videoconference feeds, detecting user input received at a user interface of a conferencing system terminal device engaged in the videoconference that identifies the demonstration object, and so forth. The one or more processors 804 can then apply the virtual background to the one or more videoconference feeds to create one or more modified background videoconference feeds in which the demonstration object of the demonstration operation is visible against the virtual background. The communication device 805 can then deliver the one or more modified background videoconference feeds to the plurality of conferencing system terminal devices.

In one or more embodiments, the conferencing system server complex 106 includes one or more memory devices 806, and one or more user interface devices 807, e.g., a display, a keyboard, a mouse, audio input devices, audio output devices, and alternate visual output devices. The conferencing system server complex 106 also includes the communication device 805. These components can be operatively coupled together such that, for example, the one or more processors 804 are operable with the one or more memory devices 806, the one or more user interface devices 807, the communication device 805, and/or other components 808 of the conferencing system server complex 106 in one or more embodiments.

The one or more processors 804 can include a microprocessor, a group of processing components, one or more ASICs, programmable logic, or other type of processing device. The one or more processors 804 can be configured to process and execute executable software code to perform the various functions of the conferencing system server complex 106.

The one or more memory devices 806 can optionally store the executable software code used by the one or more processors 804 in carrying out the operations of the videoconference system. The one or more memory devices 806 may include either or both of static and dynamic memory components. The one or more memory devices 806 can store both embedded software code and user data.

In one or more embodiments, the one or more processors 804 can define one or more process engines. For instance, the software code stored within the one or more memory devices 806 can embody program instructions and methods to operate the various functions of the conferencing system server complex 106, and also to execute software or firmware applications and modules such as the background engine 803, the demonstration operation monitoring engine 802, and/or the video conferencing engine 809. Where included, the process engines can be configured to perform video background indicia generation and application operations as previously described.

Figure 9:
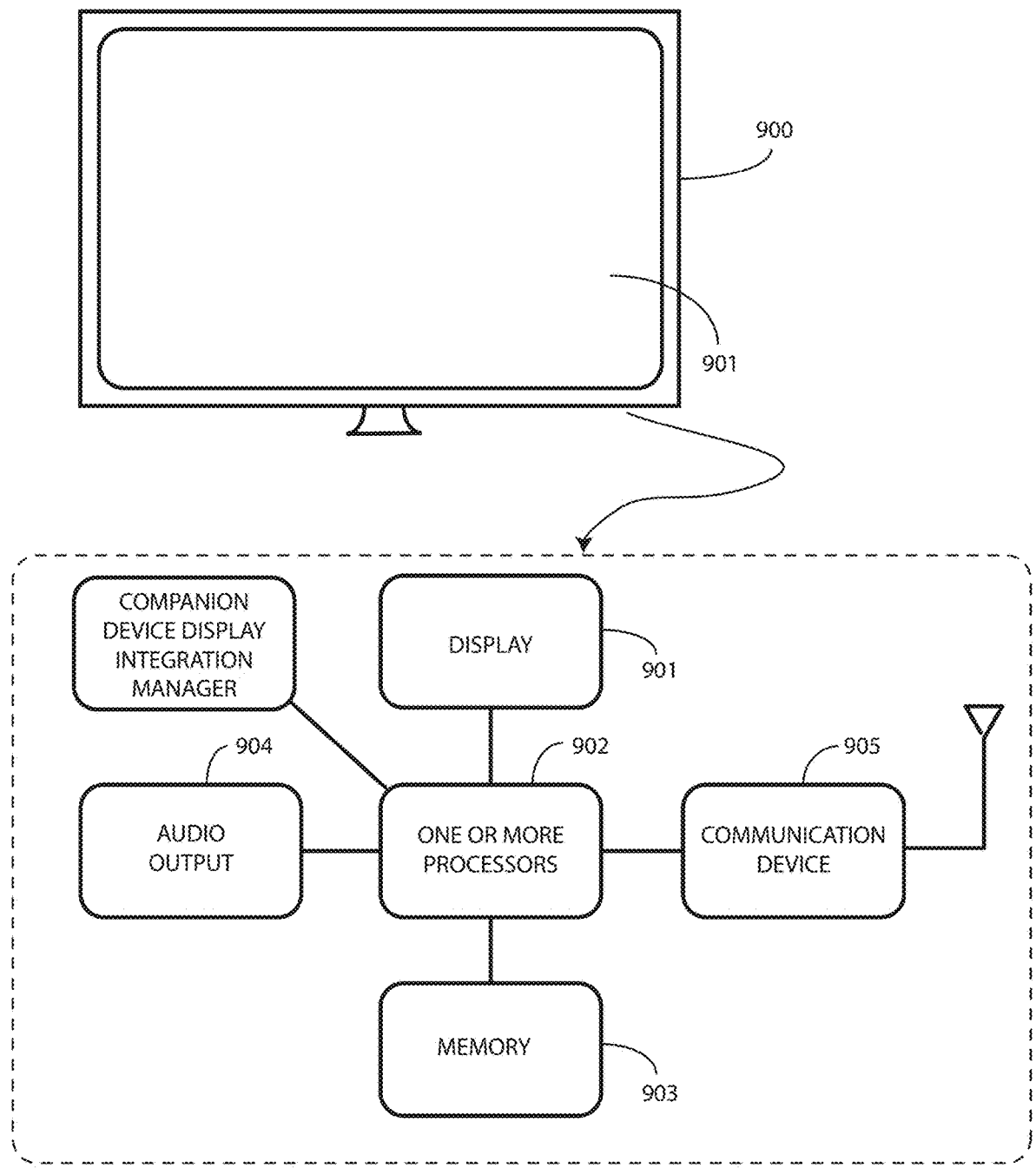
FIG. 9 illustrates one explanatory companion display device in accordance with one or more embodiments of the disclosure.

Embodiments of the disclosure contemplate that conferencing system terminal devices used in videoconferencing applications can be operable with companion devices in a "ready for" environment. Illustrating by example, a conferencing system terminal device can include a companion device display integration manager. The companion device display integration manager can be used to communicate with a companion electronic device, one example of which is a content presentation companion device. Turning now to FIG. 9, illustrated therein is one such content presentation companion device 900.

In this illustrative embodiment, the content presentation companion device 900 comprises a color video monitor. In other embodiments, the content presentation companion device 900 can take other forms. Illustrating by example, the content presentation companion device 900 can be a television, a computer display, a laptop display, a tablet computer, or a projector projecting content onto a screen. Other examples of content presentation companion devices 900 will be obvious to those of ordinary skill in the art having the benefit of this disclosure. Regardless of configuration, in one or more embodiments the content presentation companion device 900 includes one or more processors 902, a display 901, a memory 903, an audio output 904, and a communication device 905 capable of wired or wireless communication with an electronic device such as the conferencing system terminal device (101) of FIG. 7.

In one or more embodiments, when coupled by a wireless connection to such a conferencing system terminal device (101), the content presentation companion device 900 can function as an auxiliary display for the conferencing system terminal device (101). The conferencing system terminal device (101) can receive content, one example of which includes one or more videoconference feeds, from a terrestrial broadcast network, cable television network, videoconference server, Internet streaming service, or combinations thereof, and redirect this content to the content presentation companion device 900 (using its companion device display integration manager) since its display 901 is larger than the display (701) of the conferencing system terminal device (101). In one or more embodiments, content flows from the conferencing system terminal device (101) to the content presentation companion device 900 through the communication device 905.

Figure 10:
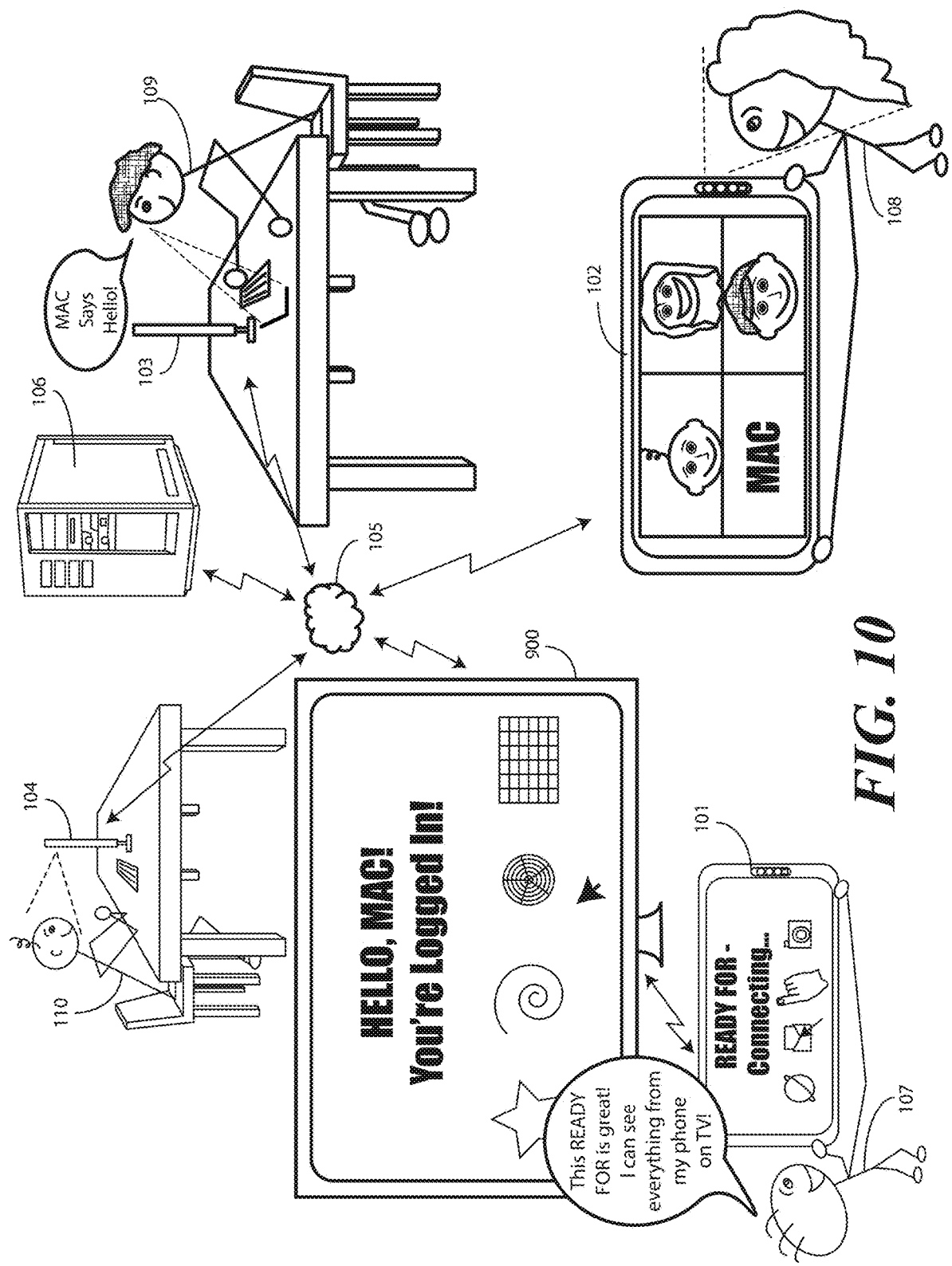
FIG. 10 illustrates one explanatory system, performing one or more method steps, in accordance with one or more embodiments of the disclosure.

Turning now to FIG. 10, illustrated therein is another explanatory videoconference system in accordance with one or more embodiments of the disclosure. As shown, multiple participants 107,108,109,110 each employ their own respective conferencing system terminal device 101,102,103,104 to engage with the other participants via the videoconference.

In this illustrative embodiment, conferencing system terminal devices 101,102 are shown as smartphones, while conferencing system terminal devices 103,104 are shown as desktop computers. Additionally, participant 107 is using a content presentation companion device 900 as an auxiliary display for his conferencing system terminal device 101. While this system provides one explanatory configuration of electronic devices engaged in a videoconference, conferencing system terminal devices suitable for use in the videoconference system can take other forms as well. For instance, tablet computers, notebook computers, audiovisual devices, mobile phones, smart watches, or other devices can be used by participants to engage in the videoconference as well. Other examples of conferencing system terminal devices will be obvious to those of ordinary skill in the art having the benefit of this disclosure.

As shown in FIG. 10 each conferencing system terminal device 101,102,103,104 is engaged in wired or wireless communication with each other across a network 105, one example of which is the Internet via the World Wide Web. It should be noted that the network 105 could be a public, private, local area, wide area, or other type of network across which wired or wireless electronic communications can be exchanged.

In this illustrative embodiment, each conferencing system terminal device 101,102,103,104 is also in communication with a video conferencing system server complex 106 across the network 105. In one or more embodiments video conferencing system server complex 106 includes components such as a web server, a database server, an audio server, and optionally a video server (the video server may be omitted for audio only conferencing systems) that are operable to facilitate videoconferences between the various conferencing system terminal devices 101,102,103,104 of the videoconference system.

These components of the video conferencing system server complex 106 can be combined on the same server. Alternatively, these components can be distributed on any number of servers to increase load handling capacity beyond that of a single server, and so forth. Other configurations for the video conferencing system server complex 106 will be obvious to those of ordinary skill in the art having the benefit of this disclosure.

In one or more embodiments, the video conferencing system server complex 106 performs functions such as maintaining a schedule of videoconferences, maintaining lists of participants, as well as allowing each participant's conferencing system terminal device to engage with the videoconference, and so forth. In one or more embodiments, the video conferencing system server complex 106 also facilitates the transmission of audio and video content during the occurrence of the videoconference.

In one or more embodiments, the video conferencing system server complex 106 functions as an intermediary device to facilitate sharing of audio and/or video content and/or data between the various conferencing system terminal devices 101,102,103,104. For example, as can be seen on the displays of conferencing system terminal device 102, in this example participant 108 can see each other participant engaged in the videoconference.

In the illustrative example of FIG. 10, as can be seen on the display of conferencing system terminal device 102, participants 108,109,110 are engaged in the videoconference. Participant 107 is in the process of pairing the content presentation companion device 900 with his conferencing system terminal device 101. Once paired, participant 107 will also join the videoconference.

In FIG. 10, the conferencing system terminal device 101 and the content presentation companion device 900 operate in tandem as a system, with the conferencing system terminal device 101 providing the processing power while the content presentation companion device 900 serves as an auxiliary display device for the conferencing system terminal device 101.

As shown in FIG. 10, the conferencing system terminal device 101 is electronically in communication with the content presentation companion device 900. When the conferencing system terminal device 101 is electronically in communication with the content presentation companion device 900, this allows the conferencing system terminal device 101 to use the larger display of the content presentation companion device 900 to present content. Illustrating by example, in one or more embodiments the conferencing system terminal device 101 can operate in a "content redirection" mode by presenting content such as movies, videos, videoconferences, images, and even a traditional computer user interface, on the display of the content presentation companion device 900.

Embodiments of the disclosure contemplate that with the advanced computing power available in smartphones and other electronic devices, users often consume movies, videos, television shows, and other content, including videoconference content, using these devices. By establishing an electronic communication channel between the conferencing system terminal device 101 and the content presentation companion device 900, the processing power of the conferencing system terminal device 101 can be leveraged to present content on the display of the content presentation companion device 900. This allows videoconference participant 107 to use the display of the content presentation companion device 900 to engage in the videoconference of FIG. 10.

Since the participants 108,109,110 are all engaged in a videoconference, each can see conference content in the form of a combined video feed from each other participant 108,109,110 presented on the display of each conferencing system terminal device 102,103,104, as well as a video feed of themselves. Under ordinary conditions, each participant 108,109,110 can hear an audio feed from each other participant 108,109,110 as well.

Figure 11:
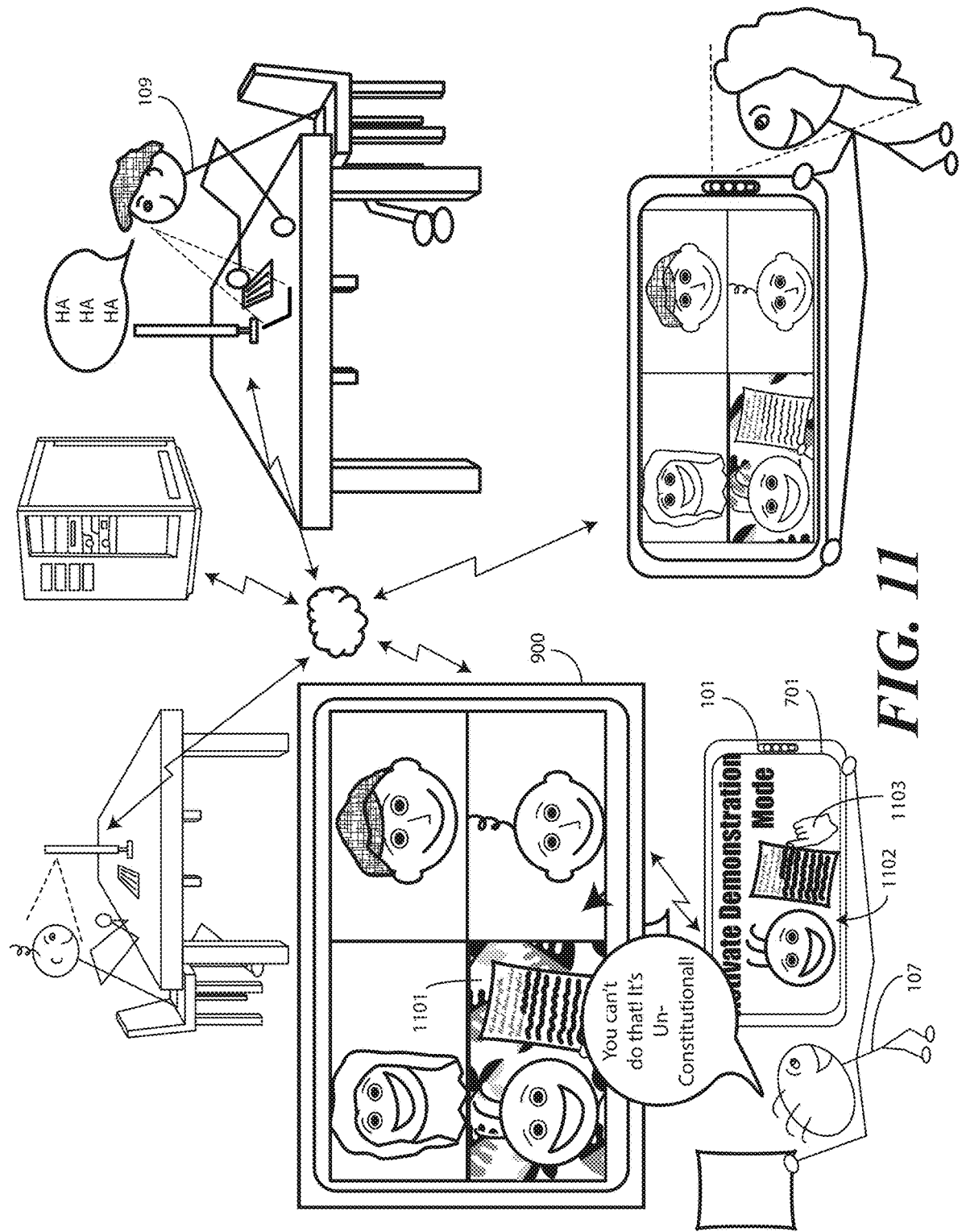
FIG. 11 illustrates another explanatory system, performing one or more method steps, in accordance with one or more embodiments of the disclosure.

Turning now to FIG. 11, participant 107 has fully engaged the videoconference. He does not want his background to be revealed, so he delivers user input to the display 701 of his conferencing system terminal device 101 causing a virtual background 1101 to be presented. The virtual background 1101 obscures, replaces, or blurs everything but depictions of the participant 107 in his videoconference feed.

Hearing that he has been assigned with a new task that he does not care for, participant 107 decides to object in a comical way. Specifically, he plans to declare the task newly assigned to him to be a violation of his rights under the United States Constitution. To make the objection even more demonstrative, participant 107 decides to perform a demonstration operation by waving a copy of the Constitution in front of the image capture device of his conferencing system terminal device 101.

While the demonstration operation monitoring engine of the conferencing system terminal device could detect the audio including the statement "you can't do that, it's unconstitutional" as indicating that the demonstration operation will commence, in this illustrative embodiment one or more processors of the conferencing system terminal device 101 present a preview 1102 on the display 701 of the conferencing system terminal device 101 that includes the images of the participant's videoconference feed without the virtual background 1101. Participant 107 then delivers a user selection 1103 to the display 701 of the conferencing system terminal device 101 identifying the US Constitution as the demonstration object. Accordingly, the one or more processors of the conferencing system terminal device 101 apply the virtual background 1101 to portions of the images depicting objects other than the subject and the demonstration object such that both the subject and the demonstration object are visible against the virtual background in the images. As shown by the reaction of participant 109, everyone has a good laugh in response.

Unfortunately, this does not prevent participant 107 from having to do the newly assigned task. Participant 107 therefore begins to contemplate life as a standup comic, reveling in the fact that he will be able to perform his standup routine from his messy bedroom using all of his props, and without anyone seeing his socks on the floor, thanks to embodiments of this very disclosure and their ability to reveal demonstration objects when a demonstration operation is detected. Accordingly, armed with a conferencing system terminal device 101 equipped with embodiments of the disclosure, a new star is born.

Figure 12:
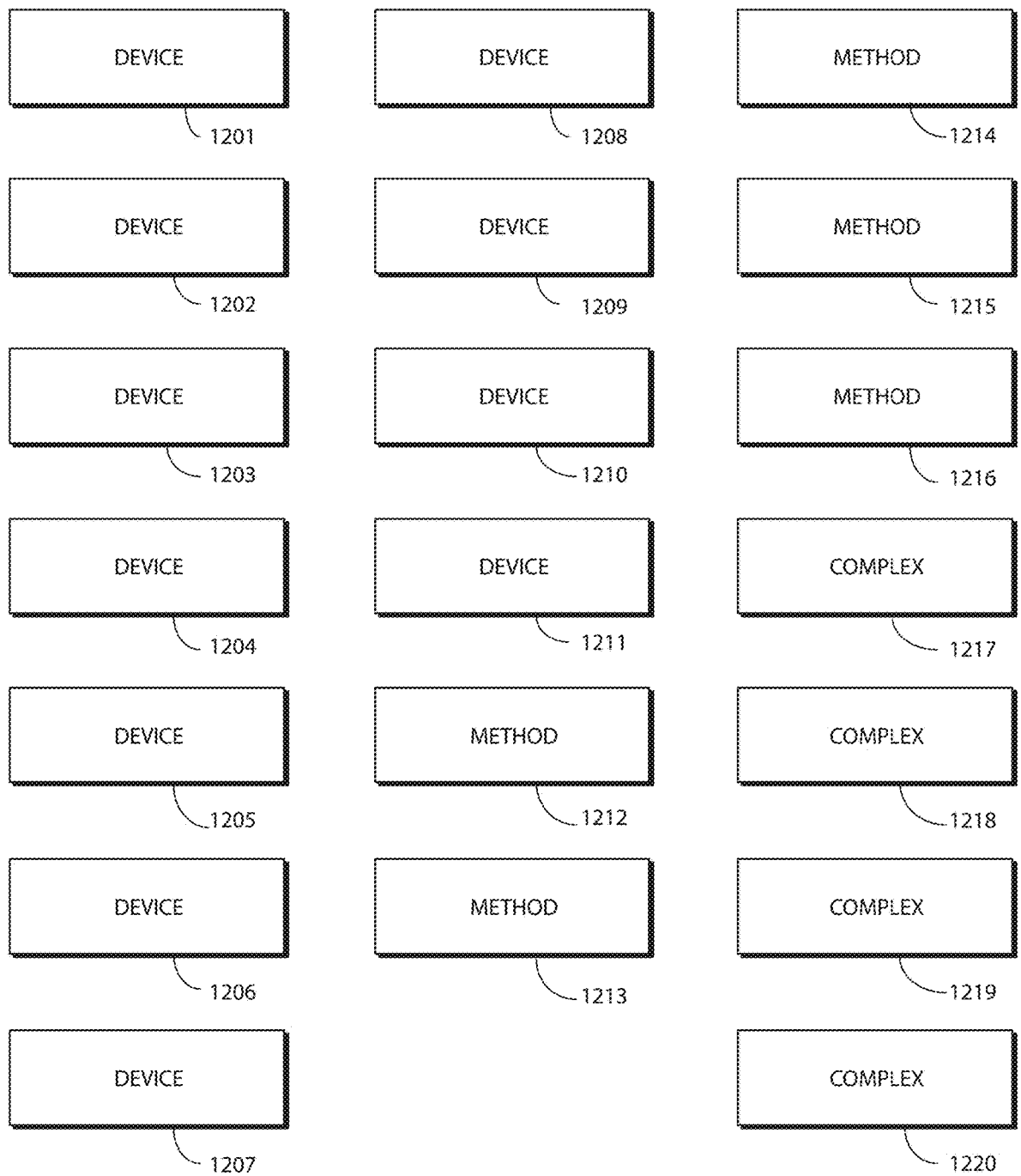
FIG. 12 illustrates various embodiments of the disclosure.

Turning now to FIG. 12, illustrated therein are various embodiments of the disclosure. The embodiments of FIG. 12 are shown as labeled boxes in FIG. 12 due to the fact that the individual components of these embodiments have been illustrated in detail in FIGS. 1-11, which precede FIG. 12. Accordingly, since these items have previously been illustrated and described, their repeated illustration is no longer essential for a proper understanding of these embodiments. Thus, the embodiments are shown as labeled boxes.

At 1201, a conferencing system terminal device comprises an image capture device capturing images of a subject during a videoconference occurring across a network. AT 120, the conferencing system terminal device comprises a communication device transmitting the images to at least one remote electronic device engaged in the videoconference.

At 1201, the conferencing system terminal device comprises one or more sensors and one or more processors. At 1201, the one or more processors apply virtual background indicia in the images behind depictions of the subject.

At 1201, the one or more processors, in response to the one or more sensors detecting initiation of a demonstration operation by the subject, cause the virtual background indicia to appear behind depictions of a demonstration object of the demonstration operation such that the demonstration object is visible against the virtual background indicia in the images transmitted to the at least one remote electronic device engaged in the videoconference. At 1202, the virtual background indicia of 1201 obscures portions of the images depicting objects other than the subject and the demonstration object.

At 1203, the one or more sensors of 1202 detect the initiation of the demonstration operation by detecting a hand of the subject moving into a field of view of the image capture device. At 1204, the one or more sensors of 1202 detect the initiation of the demonstration operation by detecting a hand of the subject holding an object moving into a field of view of the image capture device.

At 1205, the one or more sensors of 1202 detect the initiation of the demonstration operation by detecting a hand of the subject picking up an object and moving the object within a field of view of the image capture device. At 1206, the one or more sensors of 1202 detect the initiation of the demonstration operation from contextual information detected by the one or more sensors, during the videoconference, and prior to the communication device transmitting the images to the at least one remote electronic device engaged in the videoconference. At 1207, the contextual information of 1206 comprises audio received by the one or more sensors comprising an indication that the demonstration operation will commence.

At 1208, the conferencing system terminal device of 1201 further comprises a display. At 1208, the one or more processors further present a preview mode on the display allowing a user selection of the demonstration object prior to causing the virtual background indicia to appear behind the depictions of the demonstration object of the demonstration operation such that the demonstration object is visible against the virtual background indicia in the images transmitted to the at least one remote electronic device engaged in the videoconference. At 1209, the demonstration operation of 1201 comprises a document.

At 1210, the one or more processors of 1201 further detect a cessation of the demonstration operation. At 1210, the one or more processors again apply the virtual background indicia in the images behind the subject.

At 1211, the conferencing system terminal device of 1201 further comprises a user interface. At 1211, the one or more processors receive user input identifying the demonstration object prior to causing the virtual background indicia to appear behind the depictions of the demonstration object of the demonstration operation such that the demonstration object is visible against the virtual background indicia in the images transmitted to the at least one remote electronic device engaged in the videoconference.

At 1212, a method in a videoconference system comprises identifying, by one or more processors of a conferencing system terminal device, initiation of a demonstration operation during a videoconference. At 1212, the method comprises capturing, with an image capture device, images of a subject engaged in the videoconference and a demonstration object of the demonstration operation.

At 1212, the method comprises applying a virtual background to portions of the images depicting objects other than the subject and the demonstration object such that both the subject and the demonstration object are visible against the virtual background in the images. At 121, the method comprises transmitting, with a communication device operable with the one or more processors, the images across a network to another conferencing system terminal device engaged in the videoconference.

At 1213, the identifying of 1212 comprises detecting, from text-based correspondence occurring in the videoconference, a statement indicating commencement of the demonstration operation. At 1214, the method further comprises capturing audio from an environment of the conferencing system terminal device. At 1214, the identifying of 1212 detecting a statement indicating commencement of the demonstration operation. At 1215, the identifying of 1212 comprises receiving user input identifying the demonstration object at a user interface of the conferencing system terminal device.

At 1216, the method of 1212 further comprises presenting, by the one or more processors at a user interface of the conferencing system terminal device, the images without the virtual background. At 1216, the method of 1212 comprises receiving, by the one or more processors at the user interface of the conferencing system terminal device, a user selection identifying the demonstration object from the images without the virtual background.

At 1217, a conferencing system server complex comprises a video conferencing engine delivering video conferencing content to a plurality of conferencing system terminal devices during a videoconference. At 1217, the conferencing system server complex comprises a demonstration operation monitoring engine.

At 1217, the conferencing system server complex comprises one or more processors generating a virtual background in response to the demonstration operation monitoring engine detecting initiation of a demonstration operation for one or more videoconference feeds received from one or more conferencing system terminal devices of the plurality of conferencing system terminal devices. At 1217, the one or more processors apply the virtual background to the one or more videoconference feeds to create to create one or more modified background videoconference feeds in which a demonstration object of the demonstration operation is visible against the virtual background. At 1217, the one or more processors cause delivery of the one or more modified background videoconference feeds to the plurality of conferencing system terminal devices.

At 1218, demonstration operation monitoring engine of 1217 detects the initiation of the demonstration operation from audio associated with the one or more videoconference feeds. At 1219, the demonstration operation monitoring engine of 1217 detects the initiation of the demonstration operation by detecting depictions of a hand holding the demonstration object in the one or more videoconference feeds. At 1220, the demonstration operation monitoring engine of 1217 detects the initiation of the demonstration operation from user input identifying the demonstration object received from a conferencing system terminal device of the plurality of conferencing system terminal devices.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A conferencing system terminal device, comprising:
an image capture device capturing images of a subject during a videoconference occurring across a network;
a communication device transmitting the images to at least one remote electronic device engaged in the videoconference;
a display;
one or more sensors; and
one or more processors applying virtual background indicia in the images behind depictions of the subject;
the one or more processors, in response to the one or more sensors detecting initiation of a demonstration operation by the subject, causing the virtual background indicia to appear behind depictions of a demonstration object of the demonstration operation such that the demonstration object is visible against the virtual background indicia in the images transmitted to the at least one remote electronic device engaged in the videoconference, and further presenting a preview mode on the display allowing a user selection of the demonstration object prior to causing the virtual background indicia to appear behind the depictions of the demonstration object of the demonstration operation such that the demonstration object is visible against the virtual background indicia in the images transmitted to the at least one remote electronic device engaged in the videoconference.

2. The conferencing system terminal device of claim 1, the virtual background indicia obscuring portions of the images depicting objects other than the subject and the demonstration object.

3. The conferencing system terminal device of claim 2, wherein the one or more sensors detect the initiation of the demonstration operation by detecting a hand of the subject moving into a field of view of the image capture device.

4. The conferencing system terminal device of claim 2, wherein the one or more sensors detect the initiation of the demonstration operation by detecting a hand of the subject holding an object moving into a field of view of the image capture device.

5. The conferencing system terminal device of claim 2, wherein the one or more sensors detect the initiation of the demonstration operation by detecting a hand of the subject picking up an object and moving the object within a field of view of the image capture device.

6. The conferencing system terminal device of claim 2, wherein the one or more sensors detect the initiation of the demonstration operation from contextual information detected by the one or more sensors, during the videoconference, and prior to the communication device transmitting the images to the at least one remote electronic device engaged in the videoconference.

7. The conferencing system terminal device of claim 6, the contextual information comprising audio received by the one or more sensors comprising an indication that the demonstration operation will commence.

8. The conferencing system terminal device of claim 1, the preview mode identifying and tagging one or more demonstration objects.

9. The conferencing system terminal device of claim 1, the demonstration object comprising a document.

10. The conferencing system terminal device of claim 1, the one or more processors further detecting a cessation of the demonstration operation and again applying the virtual background indicia in the images behind the subject.

11. The conferencing system terminal device of claim 1, further comprising a user interface, the one or more processors receiving user input identifying the demonstration object prior to causing the virtual background indicia to appear behind the depictions of the demonstration object of the demonstration operation such that the demonstration object is visible against the virtual background indicia in the images transmitted to the at least one remote electronic device engaged in the videoconference.

12. A method in a video conferencing system, the method comprising:
identifying, by one or more processors of a conferencing system terminal device, initiation of a demonstration operation during a videoconference;
capturing, with an image capture device, images of a subject engaged in the videoconference and a demonstration object of the demonstration operation;
applying a virtual background to portions of the images depicting objects other than the subject and the demonstration object such that both the subject and the demonstration object are visible against the virtual background in the images; and
transmitting, with a communication device operable with the one or more processors, the images across a network to another conferencing system terminal device engaged in the videoconference;
further comprising:
presenting, by the one or more processors at a user interface of the conferencing system terminal device, the images without the virtual background; and
receiving, by the one or more processors at the user interface of the conferencing system terminal device, a user selection identifying the demonstration object from the images without the virtual background.

13. The method of claim 12, the identifying comprising detecting, from text-based correspondence occurring in the videoconference, a statement indicating commencement of the demonstration operation.

14. The method of claim 12, further comprising capturing audio from an environment of the conferencing system terminal device, wherein the identifying comprises detecting a statement indicating commencement of the demonstration operation.

15. The method of claim 12, the identifying comprising receiving user input identifying the demonstration object at a user interface of the conferencing system terminal device.

16. The method of claim 12, wherein the demonstration object comprises a document.

17. A conferencing system terminal device, comprising:
an image capture device capturing images of a subject during a videoconference occurring across a network;
a communication device transmitting the images to at least one remote electronic device engaged in the videoconference;
a user interface;
one or more sensors; and
one or more processors applying virtual background indicia in the images behind depictions of the subject;
the one or more processors, in response to the one or more sensors detecting initiation of a demonstration operation by the subject, causing the virtual background indicia to appear behind depictions of a demonstration object of the demonstration operation such that the demonstration object is visible against the virtual background indicia in the images transmitted to the at least one remote electronic device engaged in the videoconference, and receiving user input identifying the demonstration object prior to causing the virtual background indicia to appear behind the depictions of the demonstration object of the demonstration operation such that the demonstration object is visible against the virtual background indicia in the images transmitted to the at least one remote electronic device engaged in the videoconference.

18. The conferencing system terminal device of claim 17, wherein the user input comprises touch input from a finger, stylus, or other object disposed proximately with the user interface.

19. The conferencing system terminal device of claim 17, wherein the user interface comprises a display.

20. The conferencing system terminal device of claim 17, wherein the virtual background indicia blurs, replaces or obscures portions of the images depicting objects other than the subject and the demonstration object.

* * * * *